United States Patent
Sudo et al.

[19]

[11] Patent Number: 6,044,312
[45] Date of Patent: Mar. 28, 2000

[54] METHOD AND APPARATUS FOR PREPARING RUNNING COURSE DATA FOR AN UNMANNED DUMP TRUCK

[75] Inventors: Tsugio Sudo, Tokyo; Takao Nagai, Saitama; Kozo Miyake, Tokyo, all of Japan

[73] Assignee: Komatsu Ltd., Tokyo, Japan

[21] Appl. No.: 08/913,807

[22] PCT Filed: Mar. 22, 1996

[86] PCT No.: PCT/JP96/00750

§ 371 Date: Sep. 23, 1997

§ 102(e) Date: Sep. 23, 1997

[87] PCT Pub. No.: WO96/30815

PCT Pub. Date: Oct. 3, 1996

[30] Foreign Application Priority Data

Mar. 24, 1995 [JP] Japan .................................. 7-091286

[51] Int. Cl.[7] .............................................. G06F 165/00
[52] U.S. Cl. .............................. 701/25; 701/50; 701/209; 340/988
[58] Field of Search ................................ 701/23, 25, 50, 701/200, 202, 209, 210, 213; 73/178 R; 340/988, 990, 995; 180/167–169

[56] References Cited

U.S. PATENT DOCUMENTS

| | | | |
|---|---|---|---|
| 5,631,658 | 5/1997 | Gudat et al. ............................... | 701/50 |
| 5,646,844 | 7/1997 | Gudat et al. ............................... | 701/50 |
| 5,752,207 | 5/1998 | Sarangapani ............................. | 701/201 |
| 5,806,016 | 9/1998 | Henderson et al. ...................... | 701/50 |
| 5,848,368 | 12/1998 | Allen et al. ............................... | 701/50 |
| 5,850,341 | 12/1998 | Fournier et al. .......................... | 701/35 |

FOREIGN PATENT DOCUMENTS

| | | |
|---|---|---|
| 5-257529 | 10/1993 | Japan . |
| 5-297942 | 11/1993 | Japan . |

*Primary Examiner*—Gary Chin
*Attorney, Agent, or Firm*—Sidley & Austin

[57] ABSTRACT

The present invention relates to a method of and an apparatus for preparing travel-course data for an unmanned dump truck which can automatically prepare travel-course data with ease and improve the operability and operating efficiency. To this end, the preparing apparatus comprises a position measuring means (11), for measuring a current position of a loader; a loader controller (13), for transmitting by radio the current position, an automatic guiding mode switch (25), for selecting a mode of automatically traveling the unmanned dump truck to a new loading position; and a course preparing means (24), for preparing new travel-course data based on a new loading position and stored travel-course data by regarding the current position as a new loading position when a mode selection signal is inputted, wherein an automatic travel controller (6) rewrites the stored data as new travel-course data.

26 Claims, 15 Drawing Sheets

METHOD AND APPARATUS FOR PREPARING RUNNING COURSE DATA FOR AN UNMANNED DUMP TRUCK

TECHNICAL FIELD

The present invention relates to a method and an apparatus for preparing travel-course data for an unmanned dump truck in an unmanned dump truck operating system, and more particularly, to a method and an apparatus for automatically preparing travel-course data for an unmanned dump truck in front of and behind a loading position.

BACKGROUND ART

Hitherto, as systems for carrying earth and sand by a dump truck in a wide field such as a quarry, unmanned dump truck operating systems have been well known. In these systems, for example, a travel course of an unmanned dump truck is taught in advance, and coordinate data for each predetermined distance of the travel course are stored in a storage device. During an unmanned traveling operation, the position, where the unmanned dump truck is actually traveling, is checked for each predetermined sampling time; and the deviation, between the actual travel position and the previously stored travel-course data is calculated. Then, operating control of the steering, the vehicle speed, the starting, and the stopping of the unmanned dump truck is performed so as to reduce the deviation; and the unmanned dump truck is controlled so as to travel along the previously stored travel course.

For example, Japanese Unexamined Patent Publication No. 5-297942 discloses an unmanned dump truck operating system having an unmanned dump truck, a loader, and a fixed station. The unmanned dump truck and the fixed station are provided with a bidirectional automatic tracking device; and a control circuit section, for automatically controlling the automatic tracking devices, is provided so that light waves emitted from the automatic tracking devices to each other are always received in the front thereof. This allows the distance between the fixed station, as a reference position, and the unmanned dump truck, and its direction, to be measured, so that the current position of the unmanned dump truck is calculated. In the operating system, a loading position where the loader loads earth and sand onto the unmanned dump truck, and an unloading position are provided; and an automatic travel course for the unmanned dump truck traveling between the loading position and the unloading position is obtained by teaching. The taught data of the travel course are stored in a storage device of the unmanned dump truck.

When the unmanned dump truck travels automatically, a travel control means of the unmanned dump truck is commanded to control the steering, the vehicle speed, the starting, and the stopping, so that the deviation between the current position of the traveling unmanned dump truck and the travel-course data in the storage device is reduced. In this way, the unmanned dump truck travels automatically between the loading position and the unloading position along the taught travel course.

In order to teach the travel course, the above publication proposes a method in which an operator of the dump truck gets into the driver's seat to operate the dump truck along a desired travel course, and travel position data on a predetermined sampling point at this time are stored in the storage device. In addition, another method is proposed in which the travel control, such as the steering, the forward-reverse switching, and the vehicle speed, is performed by an unmanned guiding device using a radio; the dump truck is operated by the unmanned guiding; and the travel position data on the sampling point are stored in the storage device similar to the above description.

Incidentally, in order to increase the operating efficiency at the time of the loading operation in the quarry, an operator of the loader frequently changes the loading position so that the loading position becomes as close as possible to the quarry. However, according to the above conventional unmanned dump truck operating system, the travel course to the loading position and the travel course from the loading position must be taught each time the loading position is changed. The operation for teaching the travel course is very troublesome, and the teaching work takes time, thus resulting in poor operating efficiency.

In addition, a method of traveling the dump truck to the loading position by unmanned guiding with the use of radio requires skill in the unmanned guiding operation. Therefore, problems arise in that it takes time for an unskilled operator to perform unmanned guiding, and that even the skilled operator tires easily due to the difficult unmanned guiding operation.

SUMMARY OF THE INVENTION

The present invention has been made to solve the problems of the prior art, and its object is to provide a method and an apparatus for preparing travel-course data for an unmanned dump truck, which can automatically prepare travel-course data with ease, to thereby improve the operability and operating efficiency for an operator without having to teach a travel course each time a loading position is changed, even if the loader frequently changes the loading position.

According to the present invention, there is provided a method of preparing travel-course data for an unmanned dump truck which is traveling on a previously set travel course, loading a load by a loader at a loading position provided on the travel course, and unloading the load by traveling on the travel course, the method comprising:

obtaining a new loading position by measurement or calculation when the loader changes the loading position; calculating new travel-course data based on the data of the new loading position and the data of the travel course; and rewriting the travel-course data, stored in a course data storage device, as the new travel-course data.

By the described arrangement, the new loading position and the new travel-course data are automatically obtained in response to the change of the loading position, and the stored travel-course data is replaced with the new travel-course data, thereby performing an operation. This improves the operability and operating efficiency for an operator.

In a first aspect of an apparatus for preparing travel-course data for an unmanned dump truck according to the present invention, there is provided an apparatus for preparing travel-course data for an unmanned dump truck in an unmanned dump truck operating system including a monitor station for monitoring an unmanned dump truck traveling on a previously set travel course, loading a load by a loader at a loading position, and unloading the load; a course data storage device; an automatic travel controller for controlling the traveling of the unmanned dump truck; and a monitor controller for communicating the travel condition monitor information, etc., by radio with the automatic travel controller; the apparatus comprising:

a loader controller having attached thereto a position measuring means for measuring a current position of the loader and for transmitting by radio the current position;

an automatic guiding mode switch attached to the monitor controller for selecting a mode of automatically traveling the unmanned dump truck to a new loading position; and a course preparing means for preparing new travel-course data based on the new loading position and the stored travel-course data by regarding the current position as the new loading position when a signal of the mode selection is inputted;

wherein the automatic travel controller rewrites the stored travel-course data as the new travel-course data.

In addition, the course preparing means can be attached to either one of the monitor controller and the automatic travel controller.

By the described arrangements, the current position of the loader is transmitted by radio to the controller to which the course preparing means is attached, i.e., to the monitor controller of the monitor station, or to the automatic travel controller of the unmanned dump truck. When the loader arrives at a new loading position, and the automatic guiding mode is selected, the controller, attached to the course preparing means, regards the received current position of the loader as the new loading position, and outputs new loading position data to the course preparing means. The course preparing means prepares new travel-course data based on the new loading position data. When the course preparing means is attached to the monitor controller, the automatic travel controller receives new travel-course data from the monitor controller. On the other hand, when the course preparing means is attached to the automatic travel controller, the automatic travel controller inputs the new travel-course data directly from the course preparing means. Then, the automatic travel controller rewrites the travel-course data stored in the course data storage device, with the new travel-course data. This improves the operability and operating efficiency. According to this arrangement, when a monitoring person of the operating system monitor station can check the arrival of the loader at the new loading position, a more excellent action and effect can be obtained.

In a second aspect of an apparatus for preparing travel-course data for an unmanned dump truck according to the present invention, there is provided an apparatus, comprising:

a loader controller having attached thereto a position measuring means for measuring a current position of the loader and a trigger signal generating means for generating a trigger signal for reporting that the loader is on a new loading position, for transmitting by radio the current position and the input trigger signal to the monitor controller; and a course preparing means attached to the monitor controller for preparing new travel-course data based on the new loading position and the stored travel-course data by regarding the current position as the new loading position when receiving the trigger signal;

wherein the automatic travel controller rewrites the stored travel-course data as the new travel-course data.

The described arrangement comprises the trigger signal generating means in place of the automatic guiding mode switch of the first aspect of the above apparatus, and the trigger signal, for reporting the timing of the inputting of the new loading position, is outputted from the loader side, whereby an action and effect similar to those of the first aspect can be obtained.

In a third aspect of an apparatus for preparing travel-course data for an unmanned dump truck according to the present invention, there is provided an apparatus, comprising:

a loader controller, having attached thereto a trigger signal generating means for generating a trigger signal for reporting a calculation start timing of a new loading position;

a loading position calculating means for calculating and outputting the new loading position when inputting the trigger signal; and a course preparing means for preparing new travel-course data based on the calculated new loading position and the stored travel-course data;

wherein the automatic travel controller rewrites the stored travel-course data as the new travel-course data.

In addition, the loading position calculating means can be attached to either one of the loader controller and the monitor controller. Further, the course preparing means can be attached to either one of the monitor controller and the automatic travel controller.

By the described arrangements, an action similar to that of the automatic guiding mode switch can also be realized when the trigger signal generating means is provided on the loader controller side. That is, in the case where the course preparing means is attached to the monitor controller, when the trigger signal is transmitted from the loader controller to the monitor controller, the course preparing means prepares new travel-course data based on the loading position data, etc., similar to the above first aspect. The new travel-course data are transmitted from the monitor controller to the automatic travel controller. In the case where the course preparing means is attached to the loader controller, when the loader controller inputs the trigger signal, the course preparing means prepares new travel-course data similar to the above description. The travel-course data are transmitted from the loader controller to the automatic travel controller. This improves the operability and operating efficiency. This arrangement is particularly suitable for a case where the loader repeats the operation in accordance with a predetermined loading pattern, and can calculate the next new loading position based on the loading pattern.

In a fourth aspect of an apparatus for preparing travel-course data for an unmanned dump truck according to the present invention, there is provided an apparatus for preparing travel-course data for an unmanned dump truck in an unmanned dump truck operating system including a course data storage device for storing travel-course data of an unmanned dump truck traveling on a previously set travel course, loading a load by a loader at a loading position, and unloading the load; and an automatic travel controller for controlling the unmanned dump truck, the apparatus comprising:

a loader controller having attached thereto a position measuring means for measuring a current position of the loader and an automatic guiding mode switch for selecting a mode of automatically traveling the unmanned dump truck to a new loading position, for transmitting by radio the current position and the mode selection; and a course preparing means attached to the automatic travel controller for preparing new travel-course data based on the new loading position and the stored travel-course data by regarding the current position as the new loading position when inputting a signal of the mode selection, wherein the automatic travel controller rewrites the stored travel-course data as the new travel-course data.

In the arrangement, with respect to the first aspect of the above apparatus, the monitor station is not provided in the operating system, or the monitor controller, etc., are not provided on the monitor station. Therefore, the operation of the automatic guiding mode switch is performed by an operator of the loader. By this arrangement, an action and effect similar to those of the first aspect can also be obtained.

In a fifth aspect of an apparatus for preparing travel-course data for an unmanned dump truck according to the present invention, there is provided an apparatus, comprising:

a loader controller having attached thereto a position measuring means for measuring a current position of the loader and a trigger signal generating means for generating a trigger signal for reporting that the loader is on a new loading position; and a course preparing means for preparing new travel-course data based on the new loading position and the stored travel-course data by regarding the current position as the new loading position when receiving the trigger signal, wherein the automatic travel controller rewrites the stored travel-course data as the new travel-course data.

In addition, the course preparing means can be attached to either one of the loader controller and the automatic travel controller.

Although the monitor station or the monitor controller is not provided in the described arrangements with respect to the second aspect of the apparatus, a similar action and effect can be obtained.

In a sixth aspect of an apparatus for preparing travel-course data for an unmanned dump truck according to the present invention, there is provided an apparatus, comprising:

a loader controller, having attached thereto a trigger signal generating means for generating a trigger signal for reporting calculation start timing of a new loading position;

a loading position calculating means for calculating and outputting the new loading position when inputting the trigger signal; and a course preparing means for preparing new travel-course data based on the calculated new loading position and the stored travel-course data;

wherein the automatic travel controller rewrites the stored travel-course data as the new travel-course data.

In addition, the course preparing means can be attached to either one of the loader controller and the automatic travel controller. Further, the loading position calculating means is attached to either one of the loader controller and the automatic travel controller.

In the described arrangements, the monitor station or the monitor controller is not provided, and the arrangements are particularly useful for a case where the loader repeats the operation in accordance with a predetermined loading pattern. That is, when the trigger signal is transmitted from the loader controller to the loading position calculating means, the loading position calculating means calculates the next new loading position based on the loading pattern. The course preparing means, inputting the new loading position data similar to the above description, prepares new travel-course data. The automatic travel controller, inputting the travel-course data, rewrites the travel-course data stored in the course data storage device, as the new travel-course data. By the above description, the operability and operating efficiency are improved.

In the second, third, fifth and sixth aspects of the above apparatus, the trigger signal generating means can comprise an operating condition detecting means for detecting operating conditions of the loader, and a trigger generation judging means for judging whether or not the inputted detected operating conditions satisfy a predetermined condition, and when satisfying, for outputting the trigger signal.

By the described arrangement, the trigger generation judging means inputs operating conditions, such as the position, the load, the loading weight, and the current position of the loader from the operating condition detecting means, and outputs the trigger signal when these operating conditions satisfy predetermined conditions. Therefore, the operator does not have to judge the operating condition, thus improving the operability.

BEST MODE FOR CARRYING OUT THE INVENTION

The preferred embodiments according to the present invention will be described in detail with reference to the attached drawings.

Figure 1:
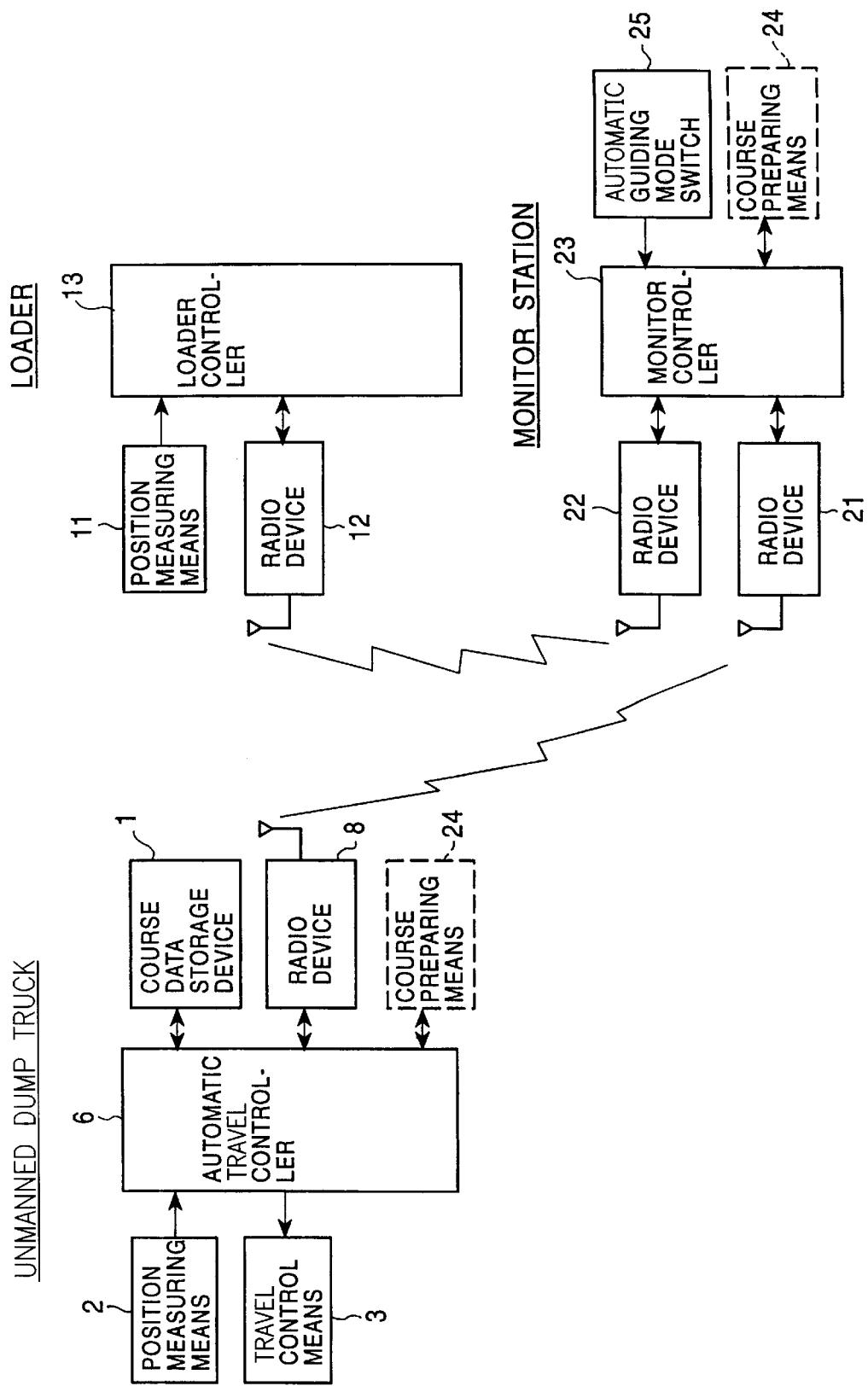
FIG. 1 is a functional block diagram of an apparatus for preparing travel-course data for an unmanned dump truck according to a first embodiment of the present invention.

A first embodiment will be described with reference to FIGS. 1 to 9. Referring to FIG. 1, a course preparing means 24, forming a main construction of the present invention, can be provided on either side of an unmanned dump truck and a monitor station, and is shown in broken lines. On a loader side, a position measuring means 11, for measuring a current position of the loader, is connected to a loader controller 13. The loader controller 13 always transmits a current position of the loader through a radio device 12 to a monitor controller 23. In the monitor station, an automatic guiding mode switch 25 is connected to the monitor controller 23. To the monitor controller 23, a first radio device 21, communicating with an automatic travel controller 6 (refer to FIG. 3) of the unmanned dump truck, and a second radio device 22, communicating with the loader controller 13, are connected. In addition, when the course preparing means 24 is provided on the monitor station side, the course preparing means 24 is connected to the monitor controller 23.

On the unmanned dump truck side, a course data storage device 1, for storing travel-course data, and a position measuring means 2, for measuring a current position at the time of the traveling, are provided. The automatic travel controller 6 inputs stored course data from the course data storage device 1, and the current position from the position measuring means 2, compares both data, and outputs commands of steering, vehicle speed, starting, and stopping to a travel-control means 3 so as to reduce a deviation therebetween. When providing the course preparing means 24 on the unmanned dump truck side, the course preparing means 24 is connected to the automatic travel controller 6. In addition, in order to communicate with the monitor controller 23, a radio device 8 is connected to the automatic travel controller 6.

Figure 2:
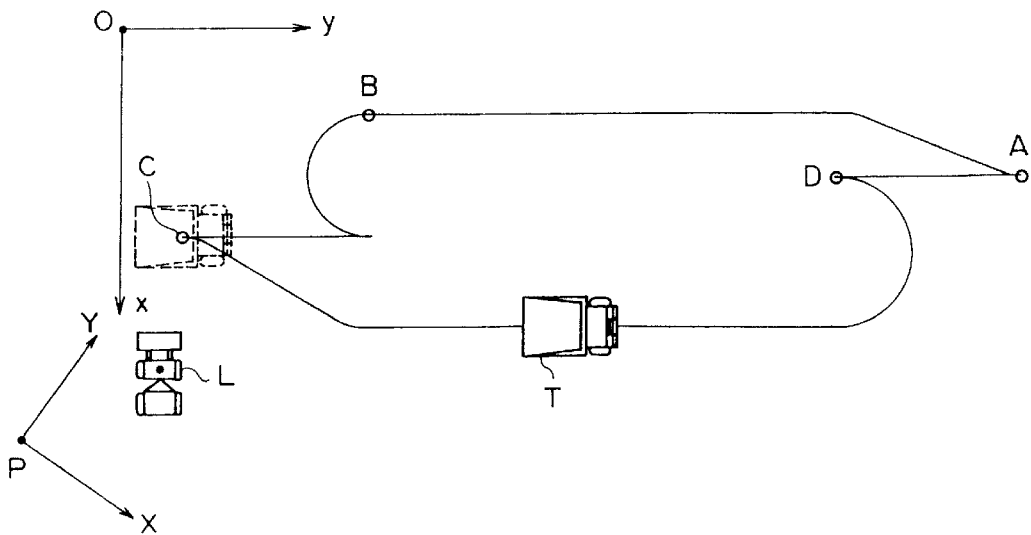
FIG. 2 is an illustration of coordinate systems of a course, an unmanned dump truck, and a loader in an operating system according to the first embodiment.

The position measuring means 11 measures the current position of the loader. FIG. 2 shows a system in which the unmanned dump truck T and the loader L are in operation, and an X-Y coordinate system of the loader L is assumed within a horizontal plane in all areas where the loader L is traveling. The position measuring means 11 measures the current position by (X, Y) coordinates of this coordinate system and an azimuth angle θ to which a tooth of the bucket of the loader L faces. As this method, for example, there is a measuring system using a GPS which obtains (X, Y, θ) coordinates by a global absolute position (latitude and longitude). In addition, a measuring system can be adopted in which a fixed radar station at a reference position is provided outside the loader L, and the (X, Y, θ) coordinates of relative positions are obtained by measuring the distance and the azimuth from the fixed radar station.

The loader controller 13 is a microcomputer system which is mainly composed of, for example, a microcomputer, and always transmits through the radio device 12 to the monitor controller 23 the current position of the loader L, inputted from the position measuring means 11. The automatic guiding mode switch 25 selects, when the unmanned dump truck T travels to the loading position, whether or not the unmanned dump truck T automatically travels along the travel course stored in the course data storage device 1. When the automatic guiding mode is selected, an automatic guiding mode signal is inputted to the monitor controller 23.

The monitor controller 23 is, similar to the loader controller 13, composed of a microcomputer system, etc. The monitor controller 23 transmits and receives a system control signal and travel condition monitor information of the unmanned dump truck T to and from the automatic travel controller 6 of the unmanned dump truck T through the first radio device 21. In addition, the monitor controller 23 receives the current position of the loader L from the loader controller 13 through the second radio device 22.

The course preparing means 24, when the automatic guiding mode signal of the automatic guiding mode switch 25 is inputted, regards the current position of the loader L as a new loading position, and prepares a travel course to the loading position and a travel course from the loading position, using the new loading position data. When the course preparing means 24 is connected to the monitor controller 23, the course preparing means 24 inputs the above automatic guiding mode signal directly from the monitor controller 23. The monitor controller 23 transmits through the first radio device 21 to the automatic travel controller 6 of the unmanned dump truck T the travel-course data prepared by the course preparing means 24. On the other hand, when the course preparing means 24 is connected to the automatic travel controller 6, the monitor controller 23 transmits controller 23 transmits through the first radio device 21 to the automatic running controller 6 the current position of the loader L and the automatic guiding mode signal.

Figure 3:
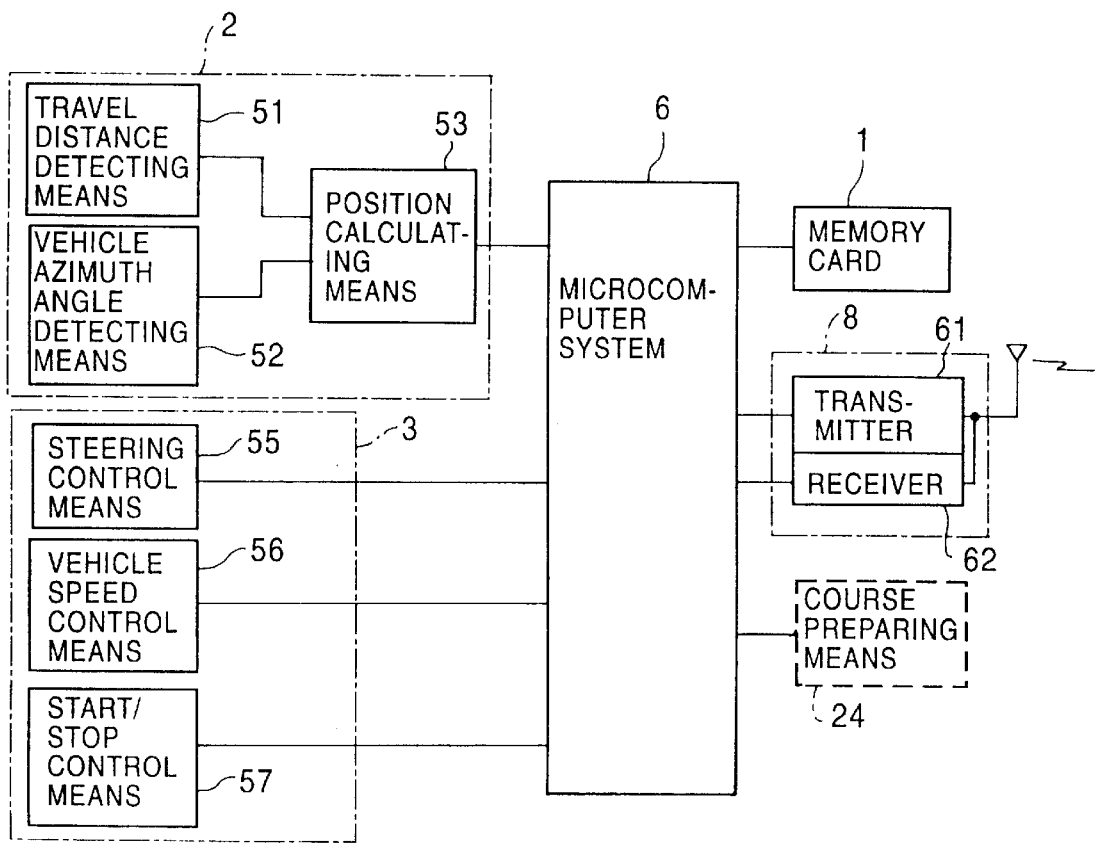
FIG. 3 is a block diagram showing a detailed arrangement of the unmanned-dump truck side of the first embodiment.

FIG. 3 illustrates a detailed arrangement of the unmanned dump truck side. The course data storage device 1 stores a travel course on which the unmanned dump truck T should automatically travel, and at least travel-course data passing through the loading position are stored therein. Since it is necessary to rewrite the travel-course data passing through the loading position, the course data storage device 1 is composed of a rewritable memory, such as a semiconductor RAM, a floppy disc memory, and an IC card memory, etc. Usually, a RAM of a battery. protected CMOS type and a flash memory, etc., are adopted so that the storage contents are not lost even if the power source of the storage device is turned off. Incidentally, in this embodiment, a memory which can easily replace a storage medium, such as an IC card memory, is adopted so as to respond to free changes of the travel course pattern on the system operation.

The position measuring means 2 measures the current position of the unmanned dump truck T. As shown in FIG. 2, an x-y coordinate system of the unmanned dump truck T is assumed within a horizontal plane in all areas where the unmanned dump truck T is traveling, and the current position of the unmanned dump truck T is measured by (x, y) coordinates in this coordinate system. The position measuring means 2 is composed of a travel distance detecting means 51, for detecting the travel distance; a vehicle azimuth angle detecting means 52, for detecting the vehicle azimuth angle; and a position calculating means 53, which inputs the travel distance and the vehicle azimuth angle to calculate an amount of movement on the x-y coordinates, thereby calculating the relative position from the current position. The travel distance detecting means 51 attaches a rotary sensor, such as a rotary detecting encoder, or an electromagnetic pickup, to a rotational shaft of the drive wheels of the unmanned dump truck, counts the number of pulses from the rotary sensor outputted in proportion to the number of rotations of the drive wheels, and calculates the travel distance from the counted value. In addition, the vehicle azimuth angle detecting means 52 is composed of, for example, a gyro, and the position calculating means 53 is composed of, for example, a microcomputer system.

The travel control means 3 receives a command from the automatic travel controller 6, and controls an unmanned traveling based on the command. The travel control means 3 is composed of a steering control means 55, for automatically controlling a steering angle of the unmanned dump truck T; a vehicle speed control means 56, for controlling the vehicle speed; and a starting/stopping-control means 57, for controlling the starting and the stopping of the unmanned dump truck T. The radio device 8 comprises a transmitter 61 and a receiver 62, and performs radio communication with the radio device 21 of the monitor station.

The automatic travel controller 6 is composed of a microcomputer system, etc., similar to the other controllers, and forms the main part for controlling the unmanned dump truck T. The automatic travel controller 6 reads from the course data, stored in the storage device 1, a travel course to be automatically followed; compares the current position of the unmanned dump truck T measured by the position measuring means 2, and the above travel course; outputs a command to the travel-control means 3, so that the deviation therebetween is reduced; and performs travel control of steering, vehicle speed, starting, and stopping. At the same time, the automatic travel controller 6 transmits and receives traveling condition monitor information of the unmanned dump truck T and an operation control signal, to and from the monitor controller 23.

In the case where the course preparing means 24 is attached to the automatic travel controller 6, the automatic travel controller 6, when inputting the automatic guiding mode signal of the automatic guiding mode switch 25, from the monitor controller 23 through the radio device 8, outputs to the course preparing means 24 the current position of the loader L and the automatic guiding mode signal, inputted through the radio device 8. The automatic travel controller 6 inputs the travel-course data, prepared by the course preparing means 24, and rewrites the travel-course data, stored in the course data storage device 1, as the inputted travel-course data.

Figure 4:
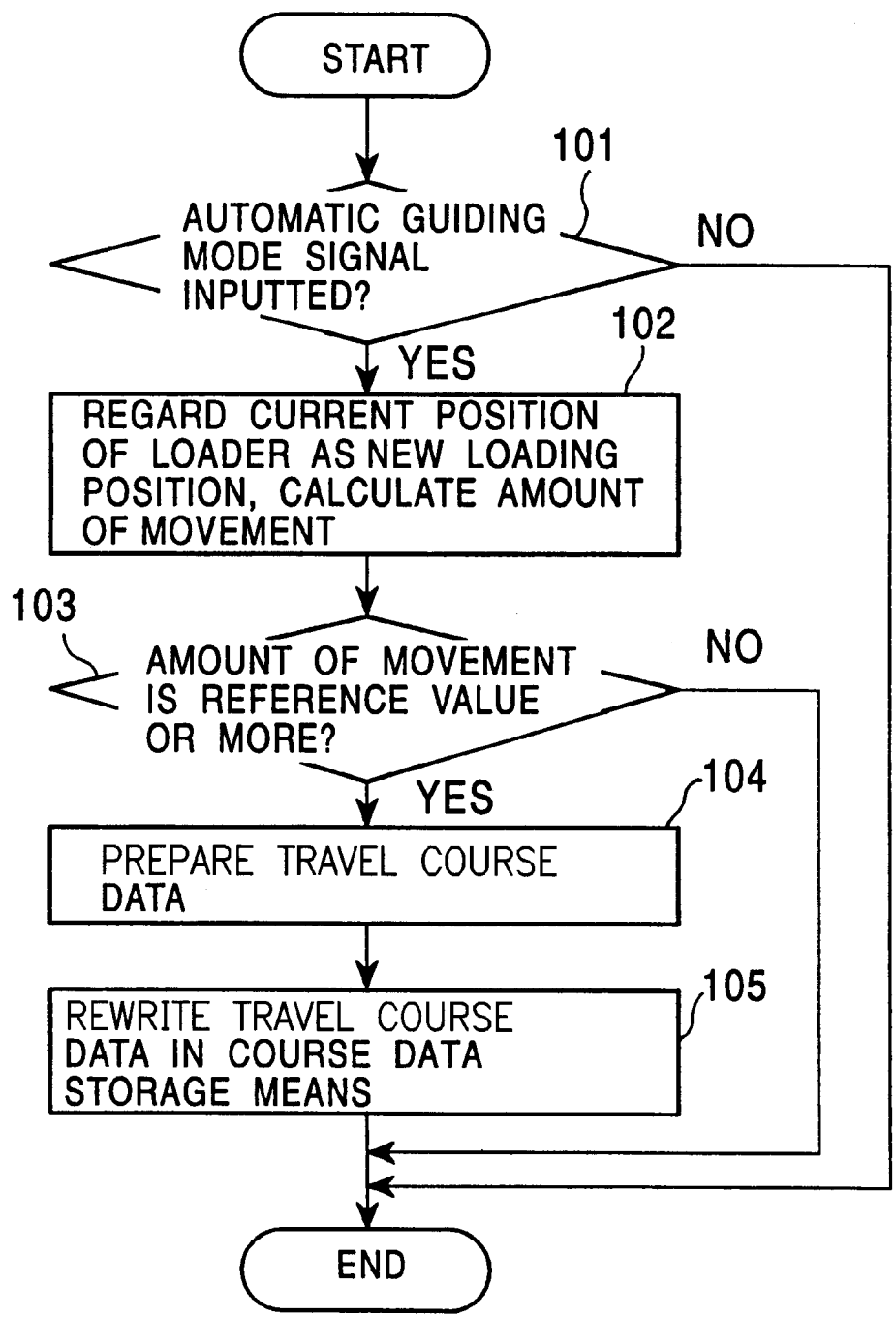
FIG. 4 is a flowchart for preparing a travel course according to the first embodiment.

Next, as regards a flow for automatically preparing a travel course to a loading position and a travel course from the loading position, a case where the course preparing means 24 is connected to the monitor controller 23 will be first described. FIG. 4 shows a flowchart for automatically preparing the travel course of this case. As shown in FIG. 2, the unmanned dump truck T automatically moves along the travel course, and stops at a stop point (point B) at an entrance (hereinafter, referred to as a face entrance) to the loading position after discharging loaded stones and rocks to an earth removal field (point A) such as a shaft. While the unmanned dump truck T is waiting for a starting instruction from the monitor station, the travel course to the loading position is automatically prepared in accordance with the flow of FIG. 4.

(Step 101) It is judged whether or not the automatic guiding mode signal is inputted. When inputted, the procedure advances to step 102. If not, the procedure skips to "END".

(Step 102) The current position of the loader L is inputted, and the current position is regarded as the loading position. The difference between the new loading position of this time and the preceding loading position (hereinafter, referred to as an amount of movement) is calculated by the loader coordinate system. The amount of movement is represented by ($\Delta X$, $\Delta Y$, $\Delta\theta$).

(Step 103) It is judged whether or not the absolute value of the amount of movement is equal to or greater than a reference value. When the reference value or greater, the procedure advances to step 104. When less than the reference value, the procedure skips to "END".

(Step 104) The new loading position is converted into position data at the coordinate system of the unmanned dump truck T, and travel-course data of predetermined zones sandwiching the loading position are automatically prepared.

(step 105) The travel-course data of the automatically prepared zones are transmitted to the automatic travel controller 6 of the unmanned dump truck T. The automatic travel controller 6 rewrites the travel-course data, of the predetermined zones in the travel-course data stored in the course data storage device 1, as the above received travel-course data.

After the travel course has been prepared and rewritten following the above flow, or after the procedure has skipped to "END" in the above flow, the automatic travel controller 6 receives the starting instruction from the monitor station, and controls automatic traveling to the new loading position along the automatically prepared travel course. Incidentally, in each step of the above flow, processing from step 101 to step 103, and the transmission of the travel-course data to the automatic travel controller 6 in step 105 are performed by the monitor controller 23. In addition, the processing of step 104 is performed by the course preparing means 24, and the rewriting of the travel-course data in step 105 is performed by the automatic travel controller 6.

Figure 5:
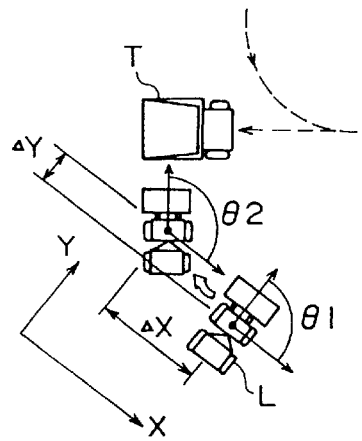
FIG. 5 is an illustration of an amount of movement of a loading position of the first embodiment.

In step 102, the amount of movement ($\Delta X$, $\Delta Y$, $\Delta\theta$) of the new loading position is obtained as follows. For example, as shown in FIG. 5, the preceding loading position is taken as (X1, Y1, $\theta$1), and the moved new loading position is taken as (X2, Y2, $\theta$2). The amount of movement ($\Delta X$, $\Delta Y$, $\Delta\theta$) at this time is obtained by the expression "$\Delta X = X2 - X1$", the expression "$\Delta Y = Y2 - Y1$", and the expression "$\Delta\theta = \theta 2 - \theta 1$".

When the moved new loading position is not separated very far from the preceding loading position, the use of the preceding travel course eliminates the necessity for calculating a new travel course. Thus, since a time for newly preparing the travel course is not required, the time of the loader L for awaiting the unmanned dump truck T at the loading position is shortened. Therefore, in step 103, the distance between the new loading position and the preceding loading position is obtained as the absolute value of the amount of movement ($\Delta X$, $\Delta Y$, $\Delta\theta$) obtained in step 102, and it is judged whether or not the distance is a reference value or greater. The reference value is a predetermined distance and angle for this judgement.

Figure 6:
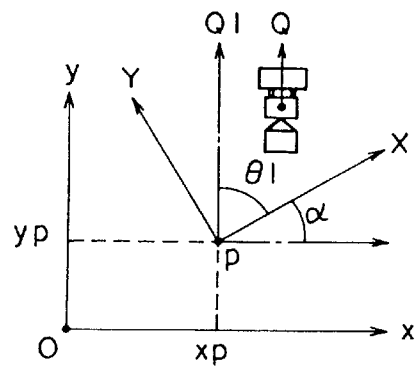
FIG. 6 is an illustration of the coordinate conversion of the unmanned dump truck and the loader of the first embodiment.

Here, the conversion of the position data at the coordinate system of the loader L into the position data at the coordinate system of the unmanned dump truck T in step 104 will now be described. FIG. 6 illustrates the relationship between these two coordinate systems. Now, a distance between an origin P of the X-Y coordinate system of the loader L and an origin O of the x-y coordinate system of the unmanned dump truck T is represented as ($x_p$, $y_p$) by the x-y coordinate system, and an angle formed by two coordinates is taken as α. In addition, the loading position is assumed to be represented as $(X_1, Y_1, \theta_1)$ by the X-Y coordinate system, and as $(x_1, y_1, \phi_1)$ by the x-y coordinate system. Here, $\theta_1$ and $\phi_1$ are assumed to represent directions to which a bucket of the loader L faces, respectively, and they are represented by angles formed by directional vector Q to which the bucket faces with the X axis, and with the x axis of each of the coordinate systems.

At this time, the relationship between $(X_1, Y_1, \theta_1)$ and $(x_1, y_1, \phi_1)$, are represented by the following generally known expressions:

$$x_1 = X_1 \cos \alpha - Y_1 \sin \alpha + x_p \quad (1)$$

$$y_1 = X_1 \sin \alpha + Y_1 \cos \alpha + y_p \quad (2)$$

$$\phi_1 = \theta_1 + \alpha \quad (3)$$

Figure 7:
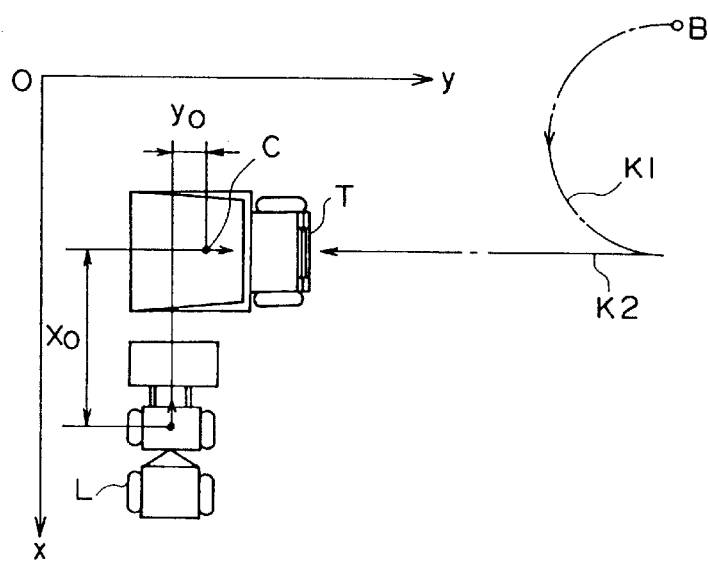
FIG. 7 is an illustration of an action of a course preparing means of the first embodiment.

In step 104, the x-y coordinates $(x_1, y_1, \phi_1)$ is obtained from the X-Y coordinates $(X_1, Y_1, \theta_1)$ of the new loading position based on the expressions (1), (2), and (3). Further, the stop position of the loader L in relation to the unmanned dump truck T at the loading position is determined in advance, and from this relation and the above obtained x-y coordinates $(x_1, y_1, \phi_1)$, the coordinates of the loading position to which the unmanned dump truck T must advance and the direction of the unmanned dump truck T at the loading position can be calculated. In the case where the loader L is an operating vehicle such as a wheel loader, the position of a wheel loader L in relation to the unmanned dump truck T is determined, as shown in FIG. 7, for example. That is, it is assumed that the unmanned dump truck T stops at the position separated from the position of the wheel loader L by $x_0$ on the x-coordinate, and $y_0$ on the y-coordinate in the direction $(x_d, y_d, \phi_d)$ perpendicular to the direction $(x_1, y_1, \phi_1)$ of the wheel loader L. At this time, the position $(x_d, y_d, \phi_d)$ of the unmanned dump truck T can be obtained by the expressions "$x_d = x_1 - x_0$", "$y_d = y_1 + y_0$", and "$\phi_d = \phi_1 - 90$ degrees", respectively.

Figure 8:
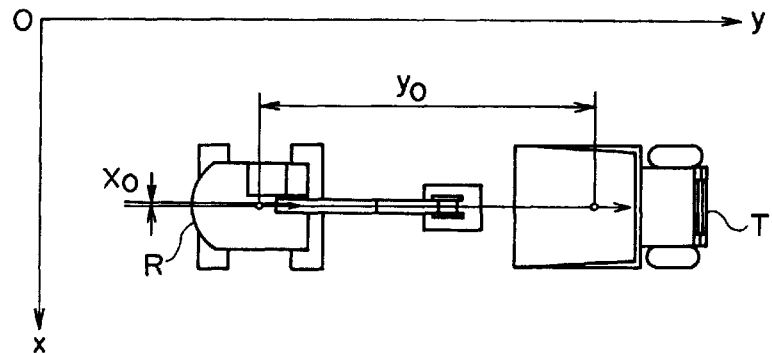
FIG. 8 is another illustration of the action of the course preparing means of the first embodiment.

In addition, when the loader L is a digging machine, such as a power shovel, the position of the digging machine R de relation to the unmanned dump truck T is determined, as shown in FIG. 8, for example. Similar to the above description, it is assumed that the unmanned dump truck T stops at the position separated from the position of the digging machine R by $x_0$ on the x-coordinate and $y_0$ on the y-coordinate in the direction $(x_d, y_d, \phi_d)$ parallel to the direction $(x_1, y_1, \phi_1)$ of the bucket of the digging machine R. At this time, the position $(x_d, y_d, \phi_d)$ of the unmanned dump truck T can be similarly obtained by the expressions "$x_d = x_1 - x_0$", "$y_d = y_1 + y_0$" and "$\phi_d = \phi_1$", respectively. Incidentally, the values of the above distances $x_0$ and $y_0$ are set in consideration of traveling errors of the unmanned dump truck T, generated at the time of automatically traveling to the new loading position, and the size of the body of the unmanned dump truck T.

After the coordinates of the loading position, to which the unmanned dump truck T must advance, and the direction of the unmanned dump truck T, at the loading position, have been calculated in such a manner as described above, travel courses of predetermined zones sandwiching the loading position are prepared, based on the loading position and the direction. In this embodiment, advancing course data from the face entrance B into the loading position C, and travel-course data from the loading position C to a shaft entrance D are prepared.

The automatic preparation of the travel-course data can be performed by assuming in advance a travel pattern of the course of the unmanned dump truck T advancing into the loading position C. For example, when the unmanned dump truck T advances into the loading position C, it is assumed that the dump truck always advances in reverse and by a linear course K2, as shown in FIG. 7. In addition, when traveling from the face entrance C to advance into the course K2, it is assumed that the dump truck travels in accordance with the course K1 along the perimeter of a circle tangent to the course K2, and changes its direction from forward to reverse. At this time, a linear expression of the course K2 can be obtained, based on the above loading position and the direction $\phi d$ of the unmanned dump truck T at the loading position; and the expression of the course K1 can be obtained, based on the linear expression and the coordinate data of the face entrance B. Coordinates for each predetermined distance on the courses K1 and K2 are obtained by these expressions, and they are taken as travel-course data. Similarly, by determining the travel course from the loading position C to the shaft entrance D to a certain travel pattern in advance, the travel course from the loading position C can be automatically prepared.

In step 105, the travel-course data automatically prepared in this way are transmitted to the automatic travel controller 6. The automatic travel controller 6 rewrites the above predetermined zones, in the travel-course data stored in the course data storage device 1, as the received travel-course data.

By the above description, the preparation and the rewriting of the new travel course associated with the movement of the loading position to the new position are completed; and, thereafter, the unmanned dump truck T can wait for the starting command from the monitor station, and travel automatically along the new travel course.

Figure 9:
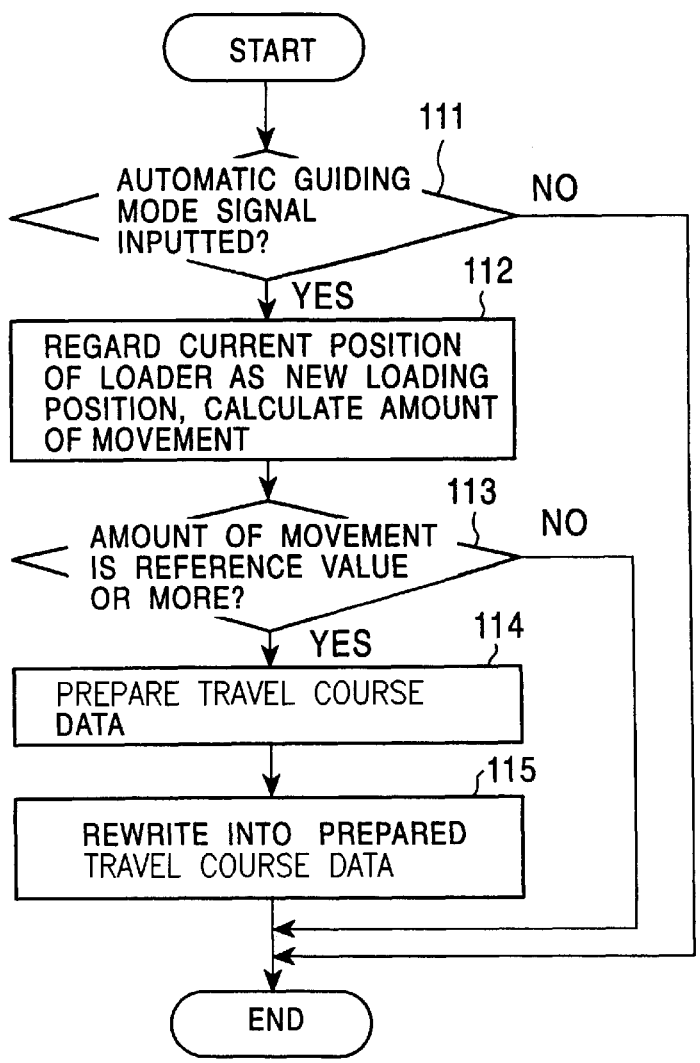
FIG. 9 is a flowchart for preparing another travel course according to the first embodiment.

The flow of automatic preparation of the course data when the course preparing means 24 is connected to the monitor controller 23 has been described above. Next, a case where the course preparing means 24 is connected to the automatic travel controller 6 will be described. In the flow of FIG. 9, the unmanned dump truck T, similar to the above description, stops at the face entrance B to await the starting instruction from the monitor station. During this period of time, the travel course to the loading position is automatically prepared in accordance with the following flowchart.

Since step 111 to step 114 are the same as the above-described steps 101 to 104, their description will be omitted.

In step 115, the automatic travel controller 6 inputs the automatically prepared travel-course data from the course preparing means 24, and rewrites travel-course data of predetermined zones, in the travel-course data stored in the course data storage device 1, as the above inputted travel-course data.

The processing flow, after the travel course has been prepared and rewritten in accordance with the above flow or after the procedure has skipped to "END", is the same as that as described above. Incidentally, as regards the processing of each step, the monitor controller 23 performs in step 111, the automatic travel controller 6 performs in steps 112, 113, and 115, and the course preparing means 24 performs in step 114.

In this example, since the course preparing means 24 is connected to the automatic travel controller 6, the automatic travel controller 6 inputs the travel-course data of the automatically prepared zones directly from the course preparing means 24. In addition, similar to the above description, the automatic travel controller 6 rewrites the travel-course data stored in the course data storage device 1, as the inputted travel-course data.

Figure 10:
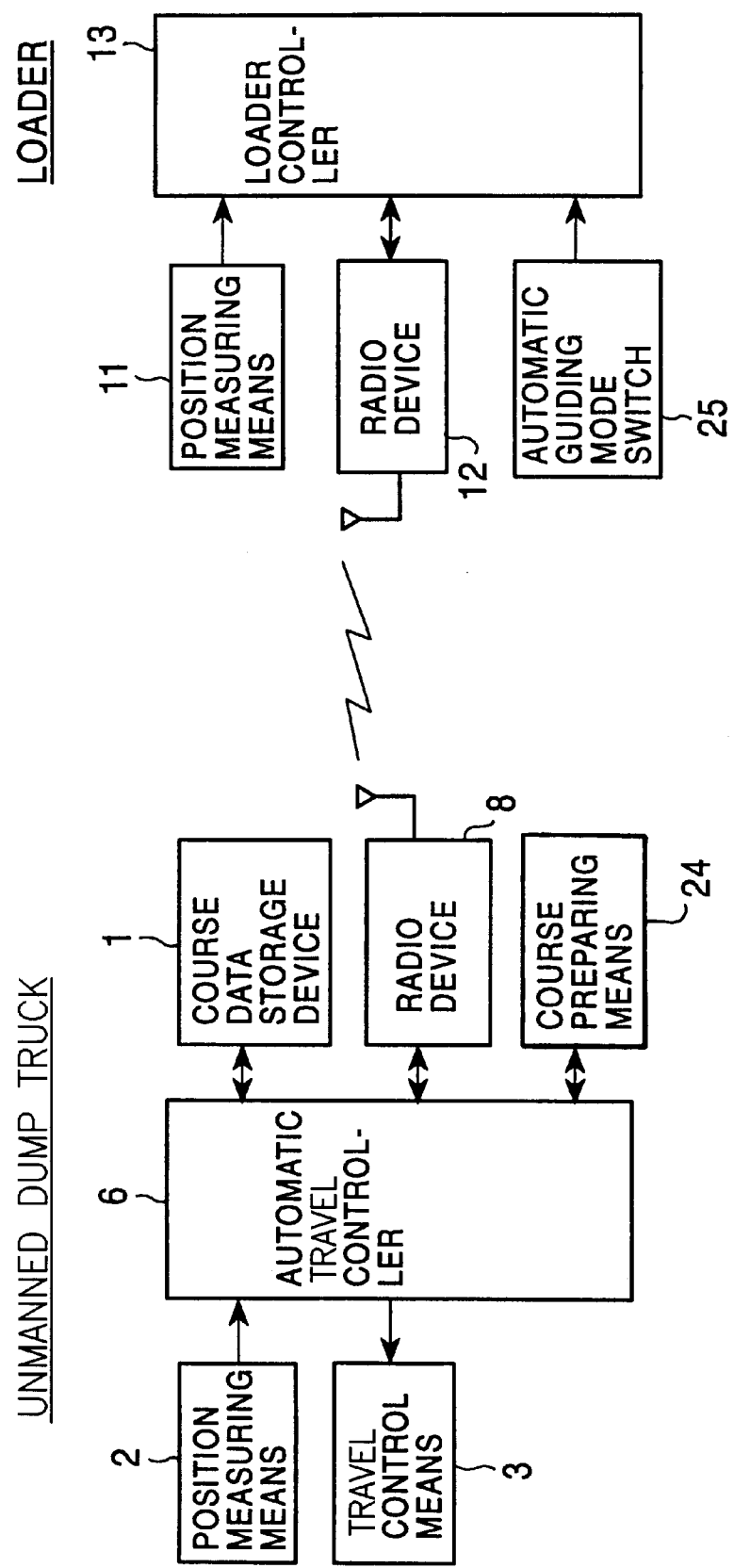
FIG. 10 is a functional block diagram of the apparatus for preparing travel-course data for the unmanned dump truck according to a second embodiment of the present invention.

Next, a second embodiment will be described. In this embodiment, as shown in FIG. 10, the course preparing means 24 is connected to the automatic travel controller 6 of the unmanned dump truck T, the automatic guiding mode switch 25 is connected to the loader controller 13, and the monitor station is not provided. The function of each constituting means is substantially the same as that of the first embodiment; but as regards the loader controller 13 and the automatic travel controller 6, the differences from the first embodiment will be described.

The loader controller 13 always transmits the current position of the loader L, measured by the position measuring means 11, to the automatic travel controller 6 through the radio device 12. The automatic travel controller 6, when receiving an automatic guiding mode signal of the automatic guiding mode switch 25, regards the current position of the loader L, received through the radio device 8, as the loading position. The automatic travel controller 6 outputs the loading position data to the course preparing means 24, and inputs travel-course data to a new loading position prepared by the course preparing means 24. Then, the automatic travel controller 6 rewrites the travel course in the course data storage device 1, as the travel-course data for the above new loading position.

The flowchart for automatically preparing the course data in this case is the same as that shown in FIG. 9 of the first embodiment. In this embodiment, however, as regards the processing of each step in this flow, the automatic travel controller 6 performs in steps 111, 112, 113, and 115, and the course preparing means 24 performs in step 114. The content of each processing step and the action are the same as those of FIG. 9. Incidentally, since the monitor station is not provided, the starting command of the unmanned dump truck T from the face entrance B can be judged by the automatic travel controller 6 to start automatically after the rewriting of the travel-course data.

Figure 11:
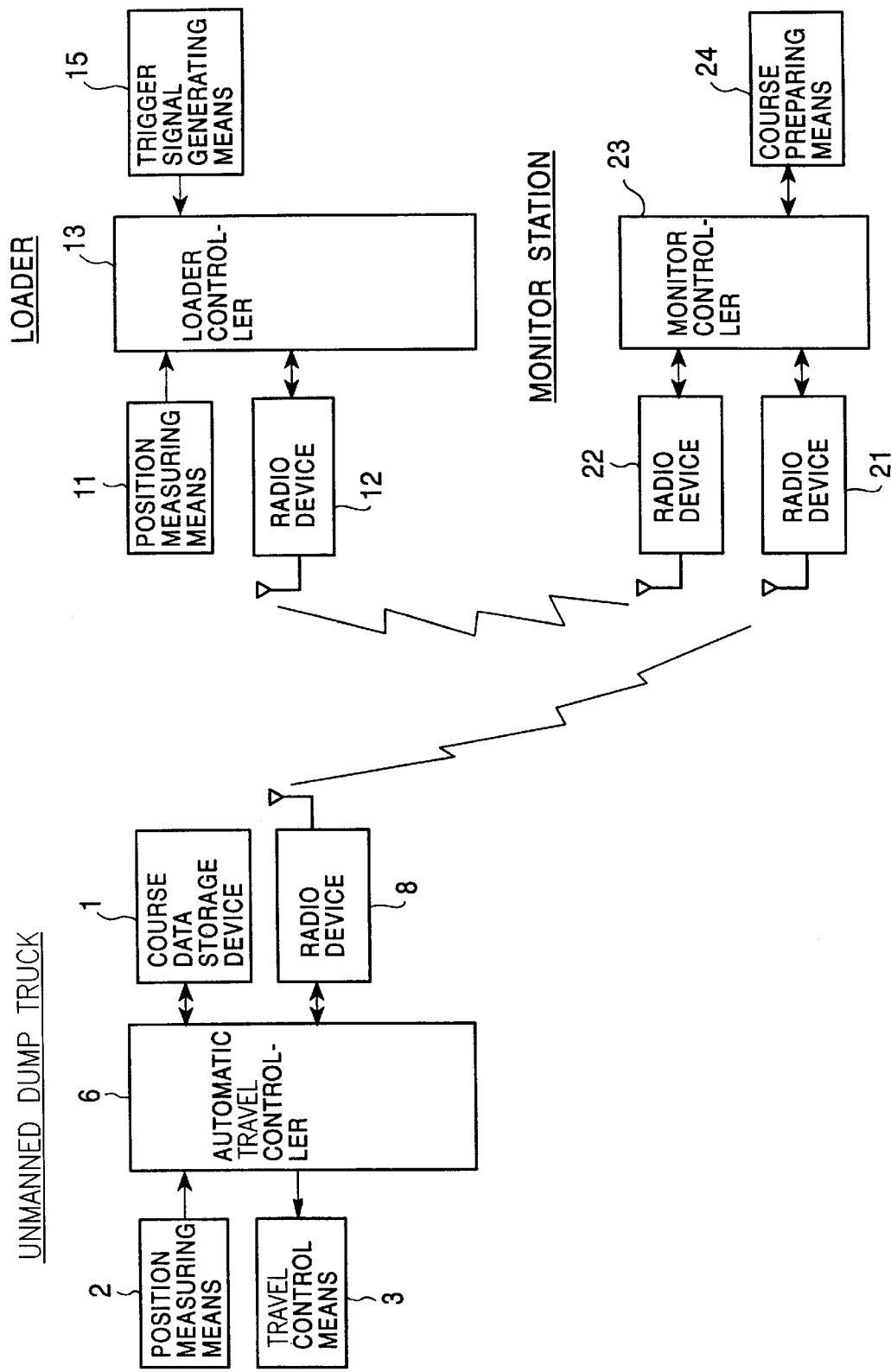
FIG. 11 is a functional block diagram of the apparatus for preparing travel-course data for the unmanned dump truck according to a third embodiment of the present invention.

Next, a third embodiment will be described. In this embodiment, a means equivalent to the automatic guiding mode switch 25, such that it generates a trigger signal for inputting the current position of the loader L as a new loading position, is provided on the loader side. Referring to FIG. 11, a trigger signal generating means 15 is connected to the loader controller 13, and the course preparing means 24 is connected to the monitor controller 23. The constituting means excepting the trigger signal generating means 15 are the same as those described above, and the trigger signal generating means 15 will now be described in detail.

Figure 12:
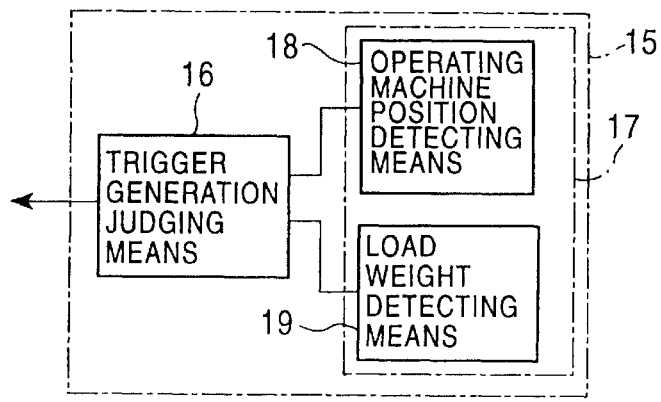
FIG. 12 is a block diagram of a trigger signal generating means of the third embodiment.

The trigger signal generating means 15 generates a trigger signal for reporting the timing of the inputting of a new loading position. The trigger signal generating means 15 can be composed of, for example, a trigger generation judging means 16 and an operating condition detecting means 17, as shown in FIG. 12. The operating condition detecting means 17 detects operating conditions of the loader L, and can be composed of, for example, an operating machine position detecting means 18 and a load weight detecting means 19. The operating machine position detecting means 18 detects the position of the operating machine of the loader L, and outputs an operating machine position signal. The load weight detecting means 19 detects a load weight in the bucket of the loader L, and outputs a load weight signal. The trigger generation judging means 16 inputs operating condition signals, i.e., the above operating machine position signal and the load weight signal, judges whether or not these signals satisfy predetermined conditions, and when satisfying, outputs a trigger signal.

Figure 13:
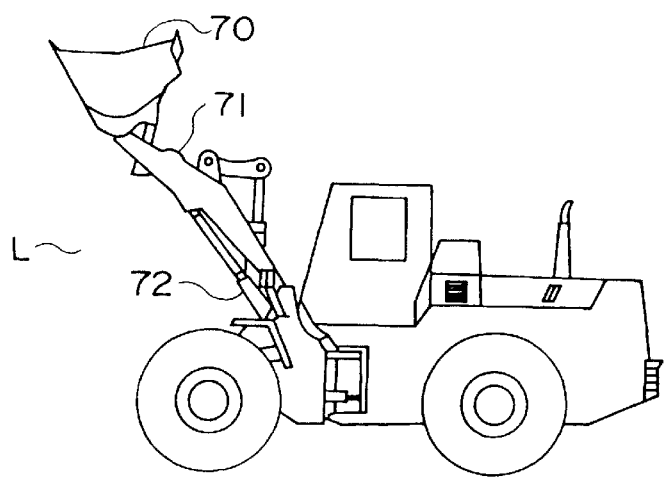
FIG. 13 is a side view of a wheel loader for explaining the trigger signal generating means of the third embodiment.
Figure 14:
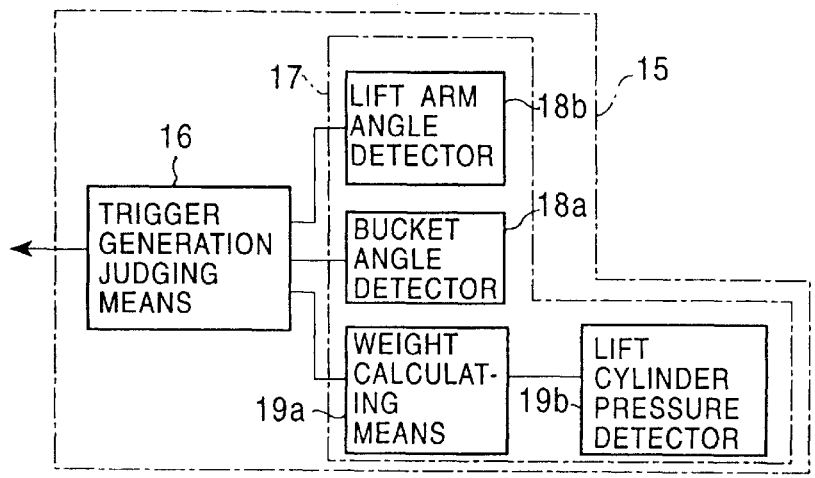
FIG. 14 is a detailed block diagram of FIG. 12.

Now, a case is considered where the loader L is a wheel loader L, such as shown in FIG. 13. In order to improve the operability for an operator, the trigger signal is automatically generated when the wheel loader L arrives at a new loading position, and a bucket 70 and a lift arm 71 take predetermined loading attitude. The operating condition detecting means 17 for this purpose can be constructed, as shown in FIG. 14, for example.

The operating machine position detecting means 18 is composed of a bucket angle detector 18a and a lift arm angle detector 18b. The bucket angle detector 18a and the lift arm angle detector 18b are potentiometers for detecting an operating angle of the bucket 70 and an operating angle of the lift arm 71, respectively. In addition, the load weight detecting means 19 is composed of a weight calculating means 19a and a lift cylinder pressure detector 19b. The lift cylinder pressure detector 19b detects the pressure in an extension chamber of a lift cylinder 72 for actuating a lift arm 71. The weight calculating means 19a calculates the magnitude of the load loaded on the lift cylinder 72 by a pressure signal from the lift cylinder pressure detector 19b. The weight calculating means 19a obtains the difference between the loads loaded on the lift cylinder 72 at the time of loading based on the difference between the above pressure signal at the time of loading to the bucket 70 and the previously inputted pressure signal at the time of no load, and calculates the load weight in the bucket 70.

At this time, the trigger generation judging means 16 judges whether or not the angle signals inputted from the bucket angle detector 18a and the lift arm angle detector 18b are within the range of the angle equivalent to the angle at the time of loading attitude. In addition, the trigger generation judging means 16 inputs the load weight signal from the weight calculating means 19a, and judges whether or not the load weight is larger than a predetermined value. When both of the above two judgements are affirmed, it can be judged that the wheel loader L is in the loading condition and is standing by in the loading attitude, so that the trigger generation judging means 16 generates the trigger signal. In this way, the trigger signal is automatically generated when the wheel loader L arrives at the new loading position and takes a predetermined loading attitude.

The flow for automatically preparing the travel course to the loading position in this embodiment is the same as that of FIG. 4 excepting step 101. In step 201 of this embodiment, corresponding to step 101, it is judged whether or not the trigger signal (equivalent to the automatic guiding mode signal) is inputted. When inputted, the procedure advances to step 102. If not, the procedure skips to "END".

By the arrangements as described above, when the trigger signal generating means 15 generates the trigger signal, the loader controller 13 transmits the trigger signal to the monitor controller 23 through the radio device 12. The monitor controller 23, when receiving the trigger signal through the radio device 22, regards the current position of the loader L as a new loading position, and outputs the loading position data to the course preparing means 24. Thereafter, similar to the above description, the course preparing means 24 prepares new travel-course data based on the loading position data. The travel-course data is transmitted from the monitor controller 23 to the automatic travel controller 6 via the radio device 21. In addition, the automatic travel controller 6 rewrites the travel-course data, stored in the course data storage device 1, as the received new travel-course data.

In this way, according to this embodiment, it is judged by the operating condition of the loader L whether or not the loader L is standing by at the loading position, and when standing by, the trigger signal is automatically outputted, whereby the loading position is inputted, so that the operability for the operator can be improved. Incidentally, the trigger signal generating means 15 can be not only a means for automatically generating the trigger signal when the operating conditions satisfy the predetermined conditions, but also an input switch similar to the automatic guiding mode switch 25 of the first embodiment. In this case, the operator of the loader L judges the loading position to operate this switch, whereby the trigger signal (equivalent to the automatic guiding mode signal) is outputted.

Figure 15:
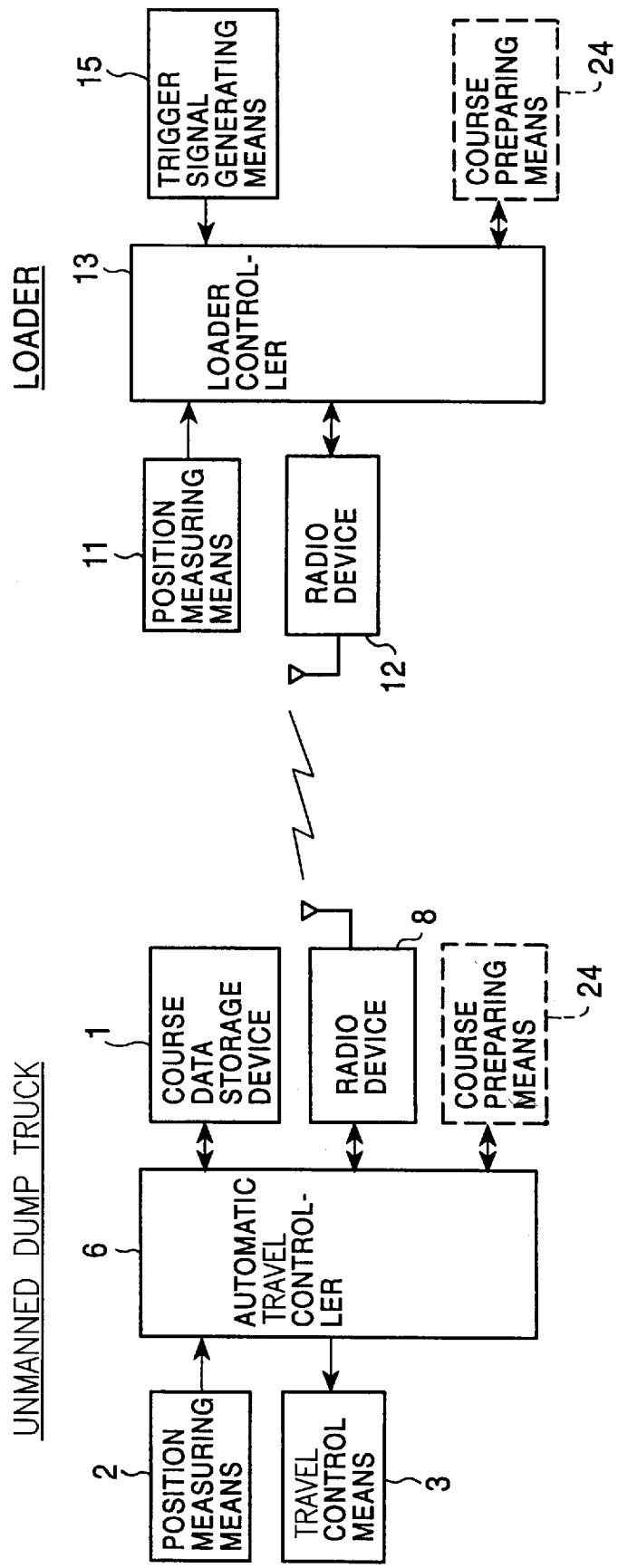
FIG. 15 is a functional block diagram of the apparatus for preparing travel-course data for the unmanned dump truck according to a fourth embodiment of the present invention.

A fourth embodiment will now be described with reference to FIG. 15. In this embodiment, the course preparing means 24 is connected to the loader controller 13 or the automatic travel controller 6, and the monitor station is not provided.

First, a case will be described where the course preparing means 24 is connected to the loader controller 13. The trigger signal generating means 15 is connected to the loader controller 13, and the functions of other constituting means are the same as those of the above description. The flowchart for automatically preparing the travel course is the same as that of FIG. 4. In this flow, however, the transmission of the travel-course data to the automatic travel controller 6 in steps 101 to 103, and 105 is performed by the loader controller 13, and in step 104, the course preparing means 24 performs the processing. In addition, the rewriting of the travel-course data in step 105 is performed by the automatic travel controller 6.

By the arrangements as described above, the loader controller 13, when inputting the trigger signal from the trigger signal generating means 15, outputs the trigger signal to the course preparing means 24. In addition, the loader controller 13 transmits the new travel-course data prepared by the course preparing means to the automatic travel controller 6 through the radio device 12. The automatic travel controller 6 rewrites the travel-course data, stored in the course data storage device 1, as the received travel-course data. In this way, the travel-course data can be automatically prepared and rewritten.

On the other hand, when the course preparing means 24 is connected to the automatic travel controller 6, the flowchart for automatically preparing the travel course is the same as that of FIG. 9. In this flow, however, steps 111 to 113, and 115 are performed by the automatic travel controller 6, and step 114 is performed by the course preparing means 24. In step 111, the trigger signal is transmitted from the loader controller 13 to the automatic travel controller 6, and the automatic travel controller 6 inputs and processes this trigger signal in accordance with step 111. In addition, since the course preparing means 24 is connected to the automatic travel controller 6, in step 115 the automatic travel controller 6 inputs the travel-course data of the automatically prepared zone directly from the course preparing means 24. Then, the automatic travel controller 6 rewrites the travel-course data stored in the course data storage device 1, as the inputted travel-course data.

In this way, the trigger signal is automatically outputted when the loader L is standing by at the loading position, so that the operability for the operator can be improved.

Figure 16:
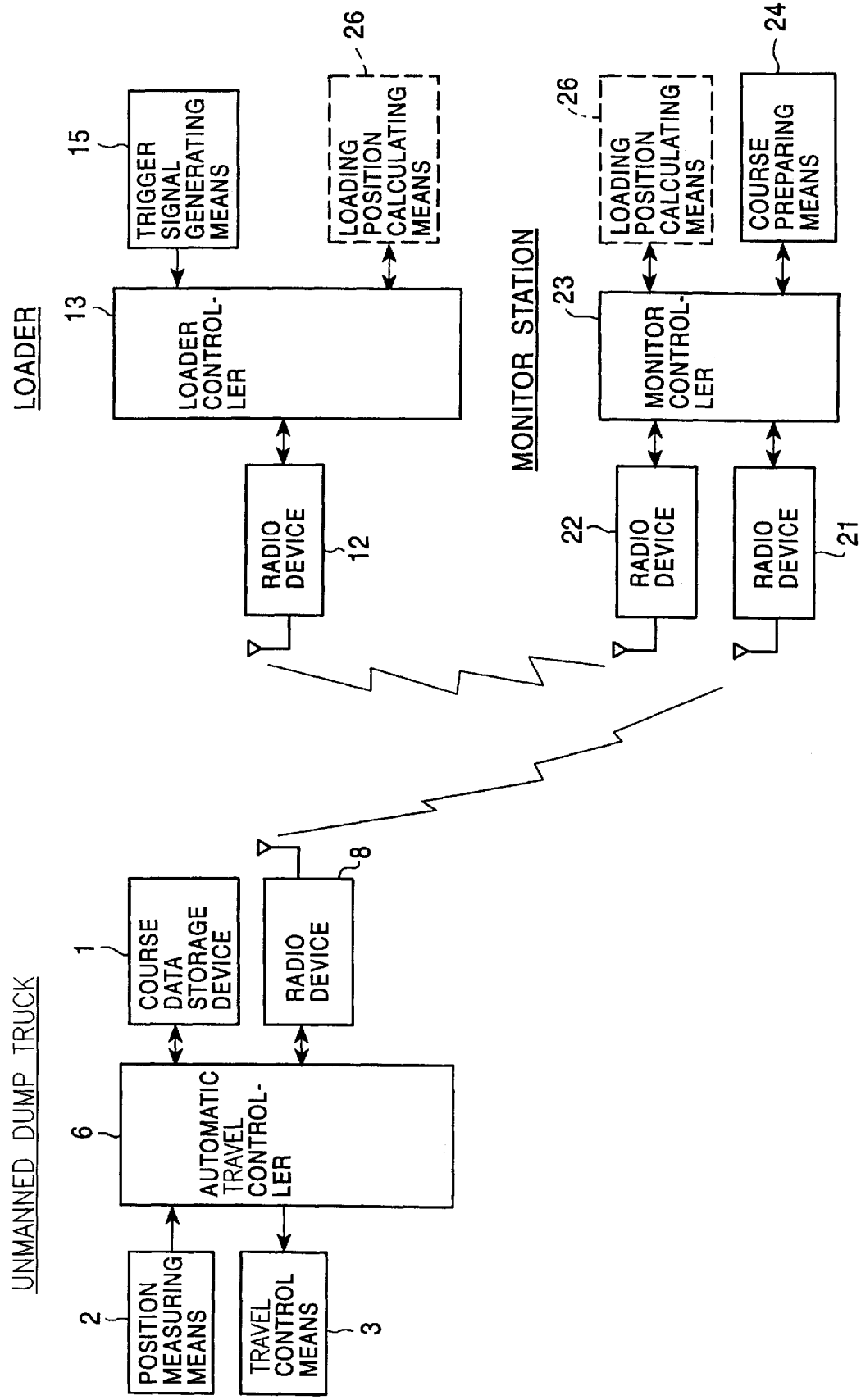
FIG. 16 is a functional block diagram of the apparatus for preparing travel-course data for the unmanned dump truck according to a fifth embodiment of the present invention.

Next, a fifth embodiment will be described. In this embodiment, the loader L repeats a loading operation in accordance with a predetermined loading pattern, and the next new loading position can be calculated based on the loading pattern. Referring to FIG. 16, the trigger signal generating means 15 is connected to the loader controller 13, and the course preparing means 24 is connected to the monitor controller 23. The functions of the constituting means, excepting a loading position calculating means 26, are the same as those of the above-described embodiments. The loading position calculating means 26 obtains the loading position by calculation in place of the position measuring means 11 of the loader L, and is composed of, for example, a microcomputer, etc. Therefore, it can be constructed by sharing the microcomputer of the loader controller 13.

Figure 17:
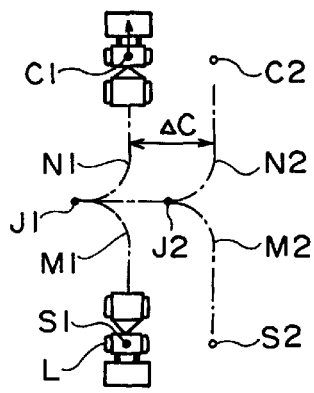
FIG. 17 is an illustration of an example of a loading pattern of the fifth embodiment.

The loading position calculating means 26 obtains the loading position by calculation with the following method. For example, it is assumed that the loader L repeats the loading operation in accordance with a predetermined loading pattern shown in FIG. 17. The loader L, after quarrying at a quarrying point S1, travels to a switchback point J1 in reverse along a travel course M1 of a predetermined pattern, and then travels to a loading position C1 in forward along a travel course N1 of a predetermined pattern. The loader L repeatedly travels on the same course until it moves to a new quarrying point S2.

When moving to the new quarrying point S2, the loader L is assumed to travel by changing the loading position to a new loading position C2 corresponding to the quarrying point S2. That is, the loader L travels from the quarrying point S1 to the switchback point J1 in reverse along M1, advances into N2 in forward via the next switchback point J2 in succession, and travels to the new loading position C. At this time, it is assumed that the travel courses M2 and N2 move parallel to M1 and N1 by a predetermined distance ΔC in a predetermined direction in accordance with a predetermined pattern. This allows the new travel courses M2 and N2 to be obtained by calculation and at the same time, allows the new loading position C2, the switchback point J2, and the quarrying point S2 to be obtained by calculation.

The flow for automatically preparing the travel course of this embodiment will be described with reference to the flowchart of FIG. 18. Advancing of the unmanned dump truck T into the flow of FIG. 18 while stopping at the face entrance B to await the starting instruction from the monitor station, and automatic travel of the unmanned dump truck T to the new loading position along the automatically prepared travel course upon receipt of the starting instruction from the monitor station after the flow processing, etc., are the same as in the above description.

(Step 121) It is judged whether or not the trigger signal is inputted. When inputted, the procedure advances to step 122. If not, the procedure skips to "END".

(Step 122) The next loading position of the loader L is calculated based on a loading pattern, and the amount of movement is calculated by the loader coordinate system.

(Step 123) It is judged whether or not the absolute value of the amount of movement is the reference value or greater. When the reference value or greater, the procedure advances to step 124. When less than the reference value, the procedure skips to "END".

(Step 124) The new loading position is converted into position data at the coordinate system of the unmanned dump truck T; and the travel-course data, of predetermined zones sandwiching the loading position, are automatically prepared.

(Step 125) The automatic travel controller 6 inputs the above automatically prepared travel-course data directly from the course preparing means 24, and rewrites the travel-course data of the above zones, in the travel-course data stored in the course data storage device 1, as the above inputted travel-course data.

Incidentally, when the loading position calculating means 26 is connected to the loader controller 13, the loader controller 13 performs the processing in step 121, and the loading position calculating means 26 performs the processing in step 122. The processing of step 123 and the transmission of the travel-course data to the automatic travel controller 6 in step 125 are performed by the monitor controller 23, and the processing of step 124 is performed by the course preparing means 24. In addition, the rewriting of the travel-course data in step 105 is performed by the automatic travel controller 6.

In this way, the loader controller 13, when inputting the trigger signal from the trigger signal generating means 15, outputs the trigger signal to the loading position calculating means 26. The loading position calculating means 26, when inputting the trigger signal, calculates the next loading position based on the loading pattern. The calculated new loading position data is transmitted from the loader controller 13 to the monitor controller 23 through the radio device 12, and is inputted to the course preparing means 24. The course preparing means 24 prepares new travel-course data to the loading position based on the loading position data. Successively, the travel-course data are transmitted to the automatic travel controller 6, and, thereafter, the automatic travel controller 6 rewrites the travel-course data to the loading position stored in the course data storage device 1, as the prepared travel-course data.

In addition, when the loading position calculating means 26 is connected to the monitor controller 23, the processing of steps 121 and 123 and the transmission of the travel-course data to the automatic travel controller 6 in step 125 are performed by the monitor controller 23. The loading position calculating means 26 performs the processing in step 122, and the course preparing means 24 performs the processing in step 124. In addition, the rewriting of the travel-course data in step 105 is performed by the automatic travel controller 6.

In this way, the loader controller 13, when inputting the trigger signal from the trigger signal generating means 15, transmits the trigger signal to the monitor controller 23 through the radio device 12. The monitor controller 23 outputs the trigger signal to the loading position calculating means 26. The loading position calculating means 26, when inputting the trigger signal, calculates the next loading position based on the loading pattern in such a way as described above. Then, the calculated new loading position data are inputted from the monitor controller 23 directly to the course preparing means 24. The course preparing means 24, similar to the above description, newly prepares travel-course data based on the loading position data. The travel-course data are transmitted to the automatic travel controller 6; and, thereafter, the automatic travel controller 6 rewrites the travel-course data in the course data storage device 1, as the prepared travel-course data.

Here, the loading position calculating means 26 can calculate a new loading position with the timing of trigger signal generation from the trigger signal generating means 15, even if the loader L does not arrive at the loading position. Therefore, the trigger signal generating means 15 can be, for example, a means having a construction as shown in FIG. 13. By this, even before the loader L arrives at the loading position, when the load weight is a predetermined value or greater, and the lift arm angle and the bucket angle are predetermined angles or greater, the travel-course data to the loading position can be automatically prepared by dispatching the trigger signal. As a result, the waiting time of the loader L at the loading position is shortened, so that the operating efficiency can be improved.

Figure 19:
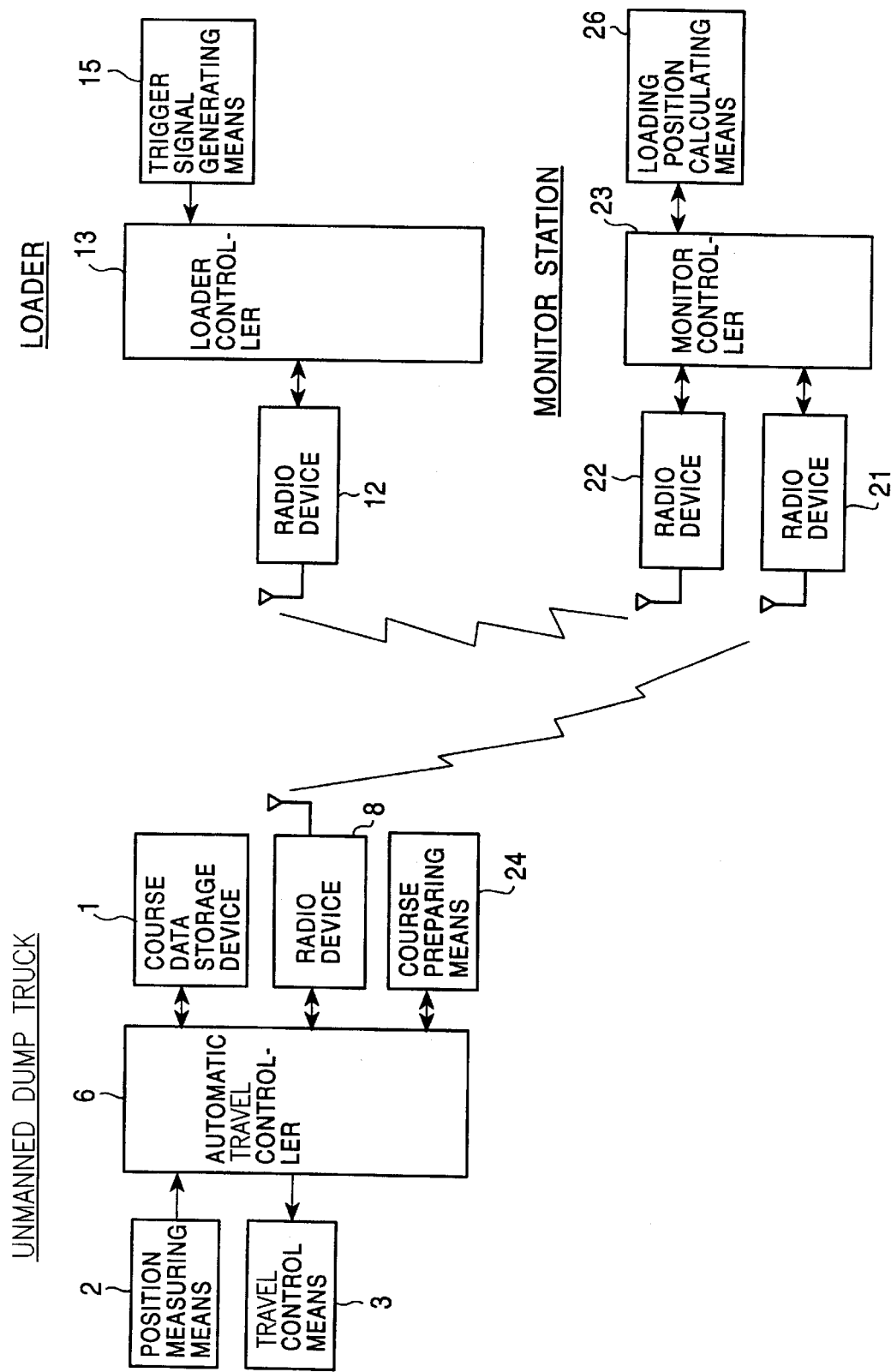
FIG. 19 is a functional block diagram of the apparatus for preparing travel-course data for the unmanned dump truck according to a sixth embodiment of the present invention.

Next, a sixth embodiment will be described. In this embodiment, as shown in FIG. 19, the loading position calculating means 26 is connected to the monitor controller 23, and the course preparing means 24 is connected to the automatic travel controller 6. Other arrangements are the same as those of the fifth embodiment. The flow for automatically preparing the travel course of this embodiment will be described with reference to the flowchart shown in FIG. 20. The processing before and after this flow is also similar to the above description.

(Step 131) It is judged whether or not the trigger signal is inputted. When inputted, the procedure advances to step 132. If not, the procedure skips to "END".

(Step 132) The next loading position of the loader L is obtained by calculation based on a loading pattern. The amount of movement, which is the difference between the preceding position and the next position, is calculated by the loader coordinate system.

(Step 133) It is judged whether or not the absolute value of the amount of movement is the reference value or greater. When the reference value or greater, the procedure advances to step 134. When less than the reference value, the procedure skips to "END".

(Step 134) The new loading position is converted into position data at the coordinate system of the unmanned dump truck T, and the travel-course data of predetermined zones sandwiching the loading position are automatically prepared.

(Step 135) The travel-course data of the automatically prepared zones are transmitted to the automatic travel controller 6 of the unmanned dump truck T. The automatic travel controller 6 rewrites the travel-course data of the predetermined data in the travel-course data stored in the course data storage device 1, as the above received travel-course data.

Incidentally, in steps 131 and 133, the monitor controller 23 performs the processing, and in step 132, the loading position calculating means 26 performs the processing. In addition, the course preparing means 24 performs the processing in step 134, and the automatic travel controller 6 performs the processing in step 135.

In this way, the loader controller 13, when inputting the trigger signal from the trigger signal generating means 15, transmits the trigger signal to the monitor controller 23 through the radio device 12. The monitor controller 23 outputs the trigger signal to the loading position calculating means 26. The loading position calculating means 26, when inputting the trigger signal, calculates the next loading position based on the loading pattern as in the fifth embodiment. Then, the calculated new loading position data are transmitted from the monitor controller 23 to the automatic travel controller 6 via the radio device 21. The automatic travel controller 6 outputs the received new loading position data directly to the course preparing means 24. The course preparing means 24 newly prepares travel-course data to the loading position based on the loading position data. Successively, the automatic travel controller 6 rewrites the travel-course data in the course data storage device 1, as the prepared travel-course data.

Figure 21:
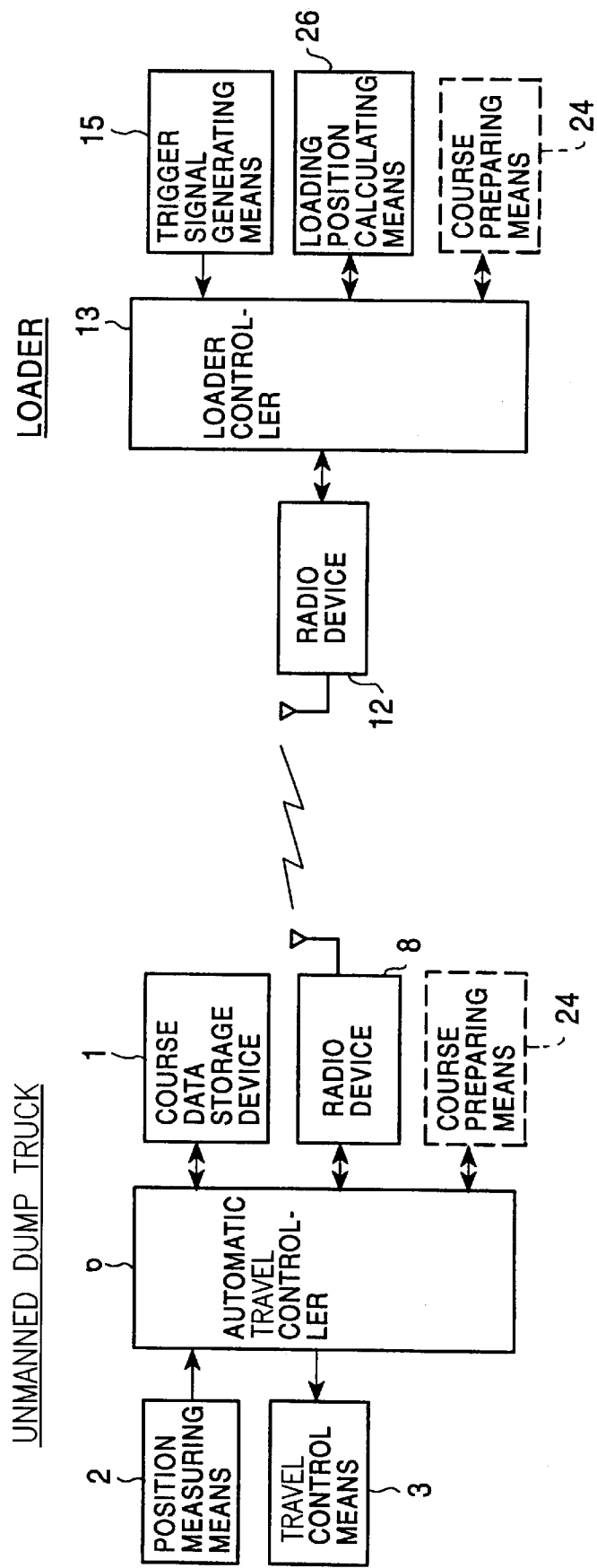
FIG. 21 is a functional block diagram of the apparatus for preparing travel-course data for the unmanned dump truck according to a seventh embodiment of the present invention.

Next, a seventh embodiment will be described. In this embodiment, as shown in FIG. 21, the loading position calculating means 26 is connected to the loader controller 13, and the course preparing means 24 is connected to the loader controller 13 or to the automatic travel controller 6. The trigger signal generating means 15 is connected to the loader controller 13. In this case, the monitor controller 23 of FIG. 19 may not be provided, and other arrangements are the same as those of the fifth embodiment.

Figure 18:
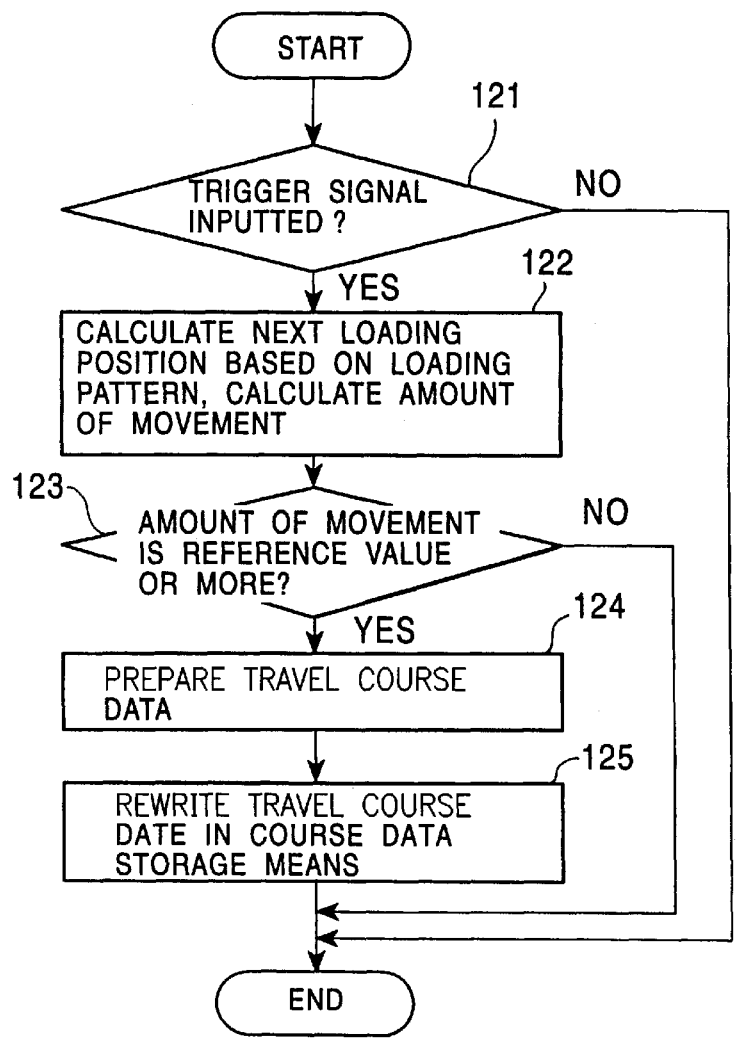
FIG. 18 is a flowchart for preparing a travel course according to the fifth embodiment.

First, when the course preparing means 24 is connected to the loader controller 13, the flow for automatically preparing the travel course is the same as that of FIG. 18. In this flow, however, the loader controller 13 performs the processing in steps 121 and 123, the loading position calculating means 26 performs the processing in step 122, the course preparing means 24 performs the processing in step 124, and the automatic travel controller 6 performs the processing in step 125, respectively.

In this way, the loader controller 13 inputs the trigger signal from the trigger signal generating means 15, and outputs to the loading position calculating means 26. The loading position calculating means 26, when inputting the trigger signal, calculates the next loading position based on the loading pattern. The course preparing means 24 newly prepares travel-course data based on the calculated new loading position data, and transmits to the automatic travel controller 6. Thereafter, the automatic travel controller 6 rewrites the travel-course data, stored in the course data storage device 1, as the prepared travel-course data.

Figure 20:
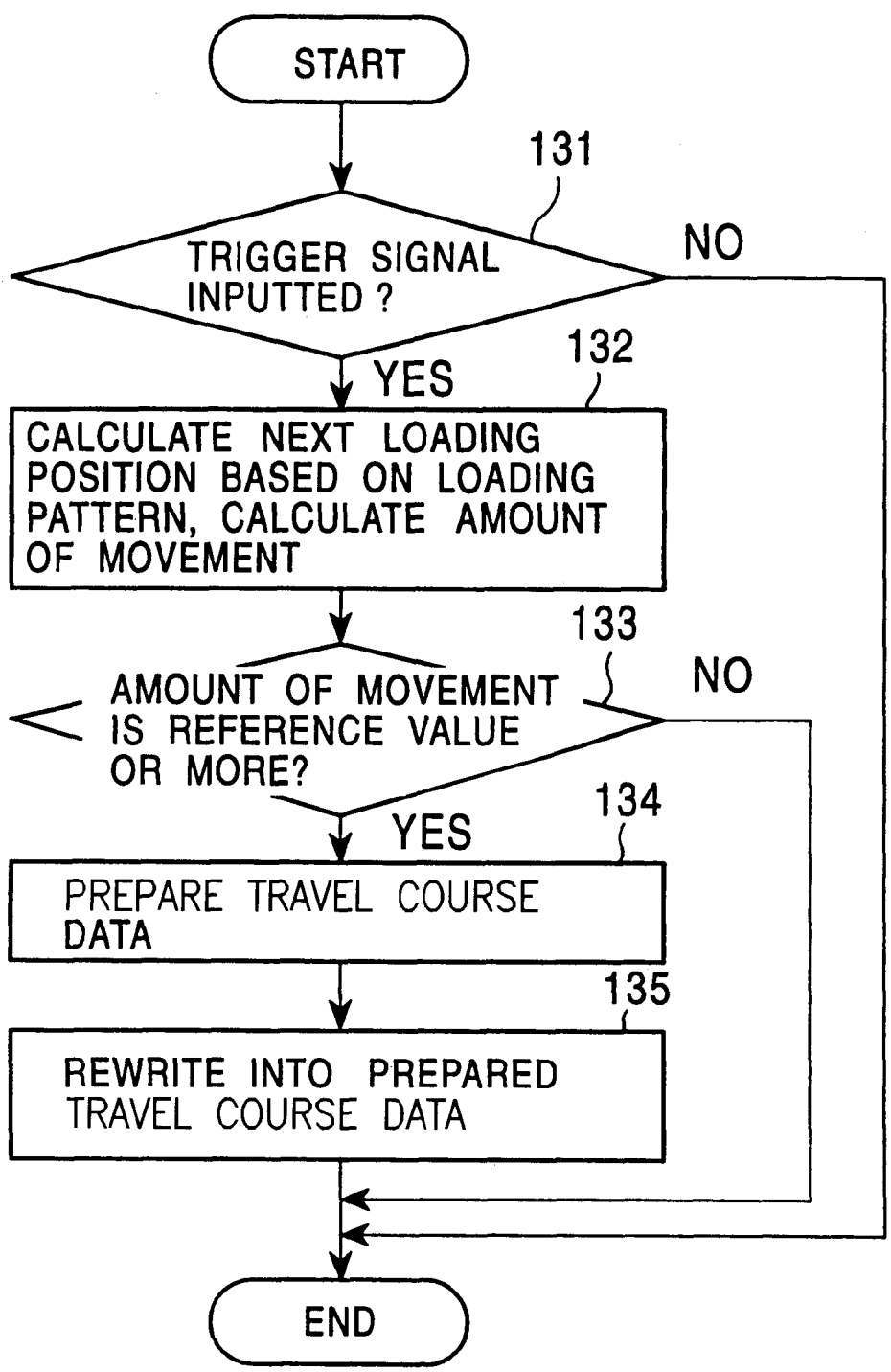
FIG. 20 is a flowchart for preparing a travel course of the sixth embodiment.

On the other hand, when the course preparing means 24 is connected to the automatic travel controller 6, the flow for automatically preparing the travel course is the same as that of FIG. 20. In this flow, however, the loader controller 13 performs the processing in step 131, the loading position calculating means 26 performs the processing in step 132, the automatic travel controller 6 performs the processing in steps 133 and 135, and the course preparing means 24 performs the processing in step 134, respectively.

In the described case, the loader controller 13, when inputting the trigger signal from the trigger signal generating means 15, outputs the trigger signal to the loading position calculating means 26. The loading position calculating means 26, when inputting the trigger signal, calculates the next loading position based on the loading pattern. The calculated new loading position data are transmitted to the automatic travel controller 6 and outputted to the course preparing means 24. The course preparing means 24 newly prepares travel-course data based on the loading position data. Thereafter, the automatic travel controller 6 rewrites the data in the course data storage device 1, as the prepared travel-course data.

Figure 22:
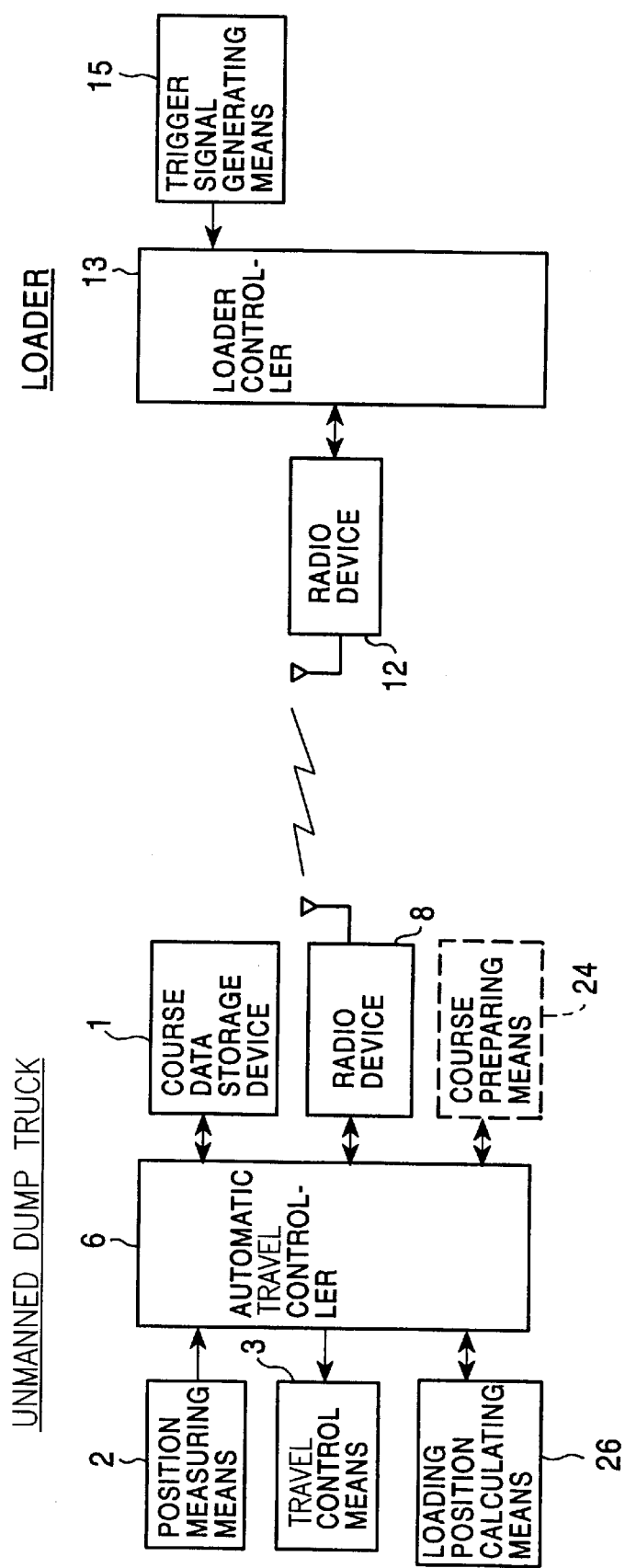
FIG. 22 is a functional block diagram of the apparatus for preparing travel-course data for the unmanned dump truck according to an eighth embodiment of the present invention.

Next, an eighth embodiment will be described. In this embodiment, as shown in FIG. 22, the loading position calculating means 26 and the course preparing means 24 are connected to the automatic travel controller 6. In this case, the monitor controller may not be provided, and other arrangements are the same as those of the fifth embodiment. The flow for automatically preparing the travel course is the same as the flow of FIG. 20. In this flow, however, the automatic travel controller 6 performs the processing in steps 131, 133, and 135, the loading position calculating means 26 performs the processing in step 132, and the course preparing means 24 performs the processing in step 134, respectively.

By the described arrangements, the loader controller 13 inputs the trigger signal from the trigger signal generating means 15, and transmits to the automatic travel controller 6. The loading position calculating means 26 inputs the trigger signal from the automatic travel controller 6, and calculates the next loading position based on the loading pattern. The automatic travel controller 6 outputs the calculated new loading position data to the course preparing means 24, and the course preparing means 24 newly prepares travel-course data based on the loading position data similar to the above description. Thereafter, the automatic travel controller 6 rewrites the travel-course data, in the course data storage device 1, as the prepared travel-course data.

As described in the above fifth to eighth embodiments, when the loader L repeats a loading operation in accordance with a predetermined loading pattern, the next new loading position is calculated based on the loading pattern with a timing of the generation of the trigger signal from the trigger signal generating means 15 of the loader L. And, travel-course data is automatically prepared using the calculated loading position data. Thus, the travel-course data can be automatically prepared before the loader L arrives at the loading position, thereby reducing the waiting time of the loader L at the loading position.

Incidentally, as will be understood from the foregoing description, the number of the operating unmanned dump truck T and the loader L in the operation system is not particularly limited. Therefore, even if a plurality of unmanned dump trucks T and loaders L are provided, the above-described actions and effects do not change.

According to the present invention as described above in detail, even if the loader frequently changes the loading position in the unmanned dump truck operating system, travel-course data can easily be automatically prepared without teaching the travel course to the loading position each time the loading position is changed, so that the operability and operating efficiency for an operator can be improved. In addition, when the operating conditions of the loader satisfy predetermined conditions, the trigger signal is automatically generated from the trigger generating means, and the loading position can be inputted or calculated with the timing of the trigger signal without depending on the judgment and operation by the operator, thus improving the operability for the operator. Further, when the loading operation is repeated in accordance with the loading pattern, the travel-course data can be automatically prepared before the loader arrives at the loading position, so that the waiting time of the loader at the loading position is reduced, whereby operational efficiency of the entire system can be improved.

INDUSTRIAL APPLICABILITY

The present invention is useful as a method and an apparatus for preparing travel-course data for an unmanned dump truck, which can automatically prepare travel-course data with ease, improve the operability and operating efficiency, and reduce a waiting time of a loader at a loading position, to improve operational efficiency of the entire system when a loading operation is repeated by a predetermined pattern.

We claim:

1. A method which comprises the steps of:

storing travel-course data representing a set travel course;

travelling an unmanned dump truck on the set travel course represented by the thus stored travel-course data;

using a loader to load a load onto said unmanned dump truck at a loading position provided on said set travel course represented by said thus stored travel-course data;

unloading said load from said unmanned dump truck by travelling said unmanned dump truck on said set travel course represented by said thus stored travel-course data;

whenever said loading position is changed to a new loading position, automatically ascertaining position coordinate data for the new loading position;

automatically calculating new travel-course data for a new set travel course for said unmanned dump truck, based on position coordinate data for said new loading position and said thus stored travel-course data; and rewriting said thus stored travel-course data with the automatically calculated new travel-course data to thereby provide new thus stored travel-course data.

2. A method in accordance with claim 1, wherein said step of automatically ascertaining the position coordinate data for the new loading position comprises using GPS to determine said position coordinate data for the new loading position.

3. A method in accordance with claim 1, wherein said step of automatically ascertaining the position coordinate data for the new loading position comprises using a fixed radar station, provided at a reference position outside of said loader, to determine said position coordinate data for the new loading position.

4. An unmanned dump truck operating system which comprises:

an unmanned dump truck;

a course data storage device for storing travel-course data representative of a set travel course for said unmanned dump truck;

an automatic travel controller, provided on said unmanned dump truck, for controlling said unmanned dump truck so as to travel along said set travel course represented by said stored travel-course data in said course data storage device;

a loader for loading a load onto said unmanned dump truck at a loading position provided on said set travel course;

a position measuring means for automatically ascertaining position coordinates of a current position of said loader;

a loader controller for automatically receiving from said position measuring means the position coordinates of said current position of said loader;

an initiation device for generating an initiation signal to initiate preparation of a new set travel course; and a course preparing means for automatically preparing new travel-course data, based on a new loading position and said stored travel-course data, by regarding said current position of said loader as said new loading position when said initiation signal is generated by said initiation device;

wherein said automatic travel controller rewrites, in said course data storage device, said stored travel-course data with the automatically prepared new travel-course data to thereby provide new thus stored travel-course data.

5. An unmanned dump truck operating system in accordance with claim 4, further comprising:

a first radio device at said loader; and a second radio device at said unmanned dump truck;

wherein said first and second radio devices provide radio communications between said loader controller and said automatic travel controller of monitored travel condition information and an operating control signal.

6. An unmanned dump truck operating system in accordance with claim 5, wherein said first and second radio devices also provide radio communications between said loader controller and said automatic travel controller of said position coordinates of said current position of said loader.

7. An unmanned dump truck operating system in accordance with claim 4, wherein said initiation device for generating said initiation signal to initiate preparation of said new set travel course comprises an automatic guiding mode switch attached to said loader controller for selecting a mode of automatically travelling said unmanned dump truck to said new loading position, and wherein said initiation signal is inputted to said course preparing means by actuation of said automatic guiding mode switch.

8. An unmanned dump truck operating system in accordance with claim 7, wherein said position measuring means automatically ascertains said current position of said loader by obtaining position coordinates from GPS.

9. An unmanned dump truck operating system in accordance with claim 7, wherein said position measuring means automatically measures said current position of said loader by obtaining position coordinates from a fixed radar station.

10. An unmanned dump truck operating system in accordance with claim 7, wherein said course data storage device is provided on said unmanned dump truck.

11. An unmanned dump truck operating system in accordance with claim 4, wherein said initiation device for generating said initiation signal to initiate preparation of said new set travel course comprises a trigger signal generating means, positioned at said loader, for generating a trigger signal for reporting that said loader is at said new loading position; and wherein said course preparing means automatically prepares said new travel-course data, based on said new loading position and said stored travel-course data by regarding said current position of said loader as said new loading position when receiving said trigger signal.

12. An unmanned dump truck operating system in accordance with claim 4, wherein said position measuring means automatically ascertains said current position of said loader by obtaining position coordinates from GPS.

13. An unmanned dump truck operating system in accordance with claim 4, wherein said position measuring means automatically measures said current position of said loader by obtaining position coordinates from a fixed radar station.

14. An unmanned dump truck operating system in accordance with claim 4, wherein said course data storage device is provided on said unmanned dump truck.

15. An unmanned dump truck operating system in accordance with claim 4, wherein said initiation device comprises:

an operating condition detecting means for detecting operating conditions of said loader; and a trigger generation judging means for judging whether or not the thus detected operating conditions satisfy predetermined conditions, and for outputting, when said thus detected operations conditions satisfy said predetermined conditions, a trigger signal as said initiation signal for reporting that said loader is at said new loading position.

16. An unmanned dump truck operating system which comprises:

an unmanned dump truck;

a course data storage device for storing travel-course data representative of a set travel course for said unmanned dump truck;

an automatic travel controller, provided on said unmanned dump truck, for controlling said unmanned dump truck so as to travel along said set travel course represented by said stored travel-course data in said course data storage device;

a loader for loading a load onto said unmanned dump truck at a loading position provided on said set travel course;

a position measuring means for automatically ascertaining position coordinates of a new loading position of said loader;

a loader controller for automatically receiving from said position measuring means the position coordinates of said new loading position of said loader;

an initiation device for generating an initiation signal to initiate preparation of a new set travel course; and a course preparing means for automatically preparing new travel-course data, based on said new loading position and said stored travel-course data, when said initiation signal is generated by said initiation device;

wherein said automatic travel controller rewrites, in said course data storage device, said stored travel-course data with the automatically prepared new travel-course data to thereby provide new thus stored travel-course data; and wherein said position measuring means for automatically ascertaining position coordinates of said new loading position of said loader comprises a loading position calculating means for automatically calculating and outputting position coordinates for said new loading position upon receiving said initiation signal.

17. An unmanned dump truck operating system which comprises:

an unmanned dump truck;

a course data storage device for storing travel-course data representative of a set travel course for said unmanned dump truck;

an automatic travel controller, provided on said unmanned dump truck, for controlling said unmanned dump truck so as to travel along said set travel course represented by said stored travel-course data in said course data storage device;

a loader for loading a load onto said unmanned dump truck at a loading position provided on said set travel course;

a monitor station for monitoring said unmanned dump truck as said unmanned dump truck travels on said set travel course;

a monitor controller, provided at said monitor station;

a first radio device at said monitor station and a second radio device at said unmanned dump truck for providing radio communications between said monitor controller and said automatic travel controller of monitored travel condition information and an operating control signal;

a position measuring means for automatically ascertaining position coordinates of a current position of said loader;

a loader controller for automatically receiving from said position measuring means the position coordinates of said current position of said loader;

a third radio device, provided at said loader, for radio communication of said position coordinates of said current position of said loader;

an initiation device for generating an initiation signal to initiate preparation of a new set travel course; and a course preparing means for automatically preparing new travel-course data, based on a new loading position and said stored travel-course data, by regarding said current position of said loader as said new loading position when said initiation signal is generated by said initiation device;

wherein said automatic travel controller rewrites, in said course data storage device, said stored travel-course data with the automatically prepared new travel-course data to thereby provide new thus stored travel-course data.

18. An unmanned dump truck operating system in accordance with claim 17, wherein said initiation device for generating said initiation signal to initiate preparation of said new set travel course comprises an automatic guiding mode switch attached to said monitor controller for selecting a mode of automatically travelling said unmanned dump truck to said new loading position, and wherein said initiation signal is inputted to said course preparing means by actuation of said automatic guiding mode switch.

19. An unmanned dump truck operating system in accordance with claim 17, wherein said initiation device for generating said initiation signal to initiate preparation of said new set travel course comprises a trigger signal generating means, positioned at said loader, for generating a trigger signal for reporting that said loader is on said new loading position; and wherein said third radio device provides for radio communication of said trigger signal to said course preparing means; and wherein said course preparing means automatically prepares new travel-course data, based on said new loading position and said stored travel-course data by regarding said current position of said loader as said new loading position when receiving said trigger signal.

20. An unmanned dump truck operating system in accordance with claim 17, wherein said position measuring means for automatically ascertaining position coordinates of said current position of said loader comprises a loading position calculating means for automatically calculating and outputting position coordinates for said new loading position upon receiving said initiation signal.

21. An unmanned dump truck operating system in accordance with claim 17, wherein said position measuring means automatically ascertains said current position of said loader by obtaining position coordinates from GPS.

22. An unmanned dump truck operating system in accordance with claim 17, wherein said position measuring means automatically measures said current position of said loader by obtaining position coordinates from a fixed radar station.

23. An unmanned dump truck operating system in accordance with claim 17, wherein said course data storage device is provided on said unmanned dump truck.

24. An unmanned dump truck operating system in accordance with claim 17, wherein said initiation device comprises:

an operating condition detecting means for detecting operating conditions of said loader; and a trigger generation judging means for judging whether or not the thus detected operating conditions satisfy predetermined conditions, and for outputting, when said thus detected operations conditions satisfy said predetermined conditions, a trigger signal as said initiation signal for reporting that said loader is at said new loading position.

25. An unmanned dump truck operating system which comprises:

an unmanned dump truck;

a course data storage device for storing travel-course data representative of a set travel course for said unmanned dump truck;

an automatic travel controller, provided on said unmanned dump truck, for controlling said unmanned dump truck so as to travel along said set travel course represented by said stored travel-course data in said course data storage device;

a loader for loading a load onto said unmanned dump truck at a loading position provided on said set travel course;

a monitor station for monitoring said unmanned dump truck as said unmanned dump truck travels on said set travel course;

a monitor controller, provided at said monitor station;

a first radio device at said monitor station and a second radio device at said unmanned dump truck for providing radio communications between said monitor controller and said automatic travel controller of monitored travel condition information and an operating control signal;

a position measuring means for automatically ascertaining position coordinates of a new loading position of said loader;

a loader controller for automatically receiving from said position measuring means the position coordinates of said new loading position of said loader;

a third radio device, provided at said loader, for radio communication of said position coordinates of a current position of said loader;

an initiation device for generating an initiation signal to initiate preparation of a new set travel course; and a course preparing means for automatically preparing new travel-course data, based on said new loading position and said stored travel-course data, when said initiation signal is generated by said initiation device;

wherein said automatic travel controller rewrites, in said course data storage device, said stored travel-course data with the automatically prepared new travel-course data to thereby provide new thus stored travel-course data; and wherein said position measuring means for automatically ascertaining position coordinates of said new loading position of said loader comprises a loading position calculating means for automatically calculating and outputting position coordinates for said new loading position upon receiving said initiation signal.

26. An unmanned dump truck operating system in accordance with claim 25, wherein said initiation device comprises:

an operating condition detecting means for detecting operating conditions of said loader; and a trigger generation judging means for judging whether or not the thus detected operating conditions satisfy predetermined conditions, and for outputting, when said thus detected operations conditions satisfy said predetermined conditions, a trigger signal as said initiation signal for reporting that said loader is at said new loading position.

* * * * *